United States Patent
Triscon

(10) Patent No.: US 11,488,079 B2
(45) Date of Patent: Nov. 1, 2022

(54) MULTI-PLATFORM DATA AGGREGATION AND AUTOMATION SYSTEM

(71) Applicants: Atlassian Pty Ltd., Sydney (AU); Atlassian Inc., San Francisco, CA (US)

(72) Inventor: Oscar Del Pozo Triscon, New York, NY (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 10 days.

(21) Appl. No.: 17/077,977

(22) Filed: Oct. 22, 2020

(65) Prior Publication Data

US 2022/0129853 A1  Apr. 28, 2022

(51) Int. Cl.
| | |
|---|---|
| *G06Q 10/06* | (2012.01) |
| *G06F 3/04842* | (2022.01) |
| *G06F 16/26* | (2019.01) |
| *G06F 16/2455* | (2019.01) |
| *G06Q 10/10* | (2012.01) |
| *G06Q 30/00* | (2012.01) |
| *G06Q 10/00* | (2012.01) |

(52) U.S. Cl.
CPC . *G06Q 10/063114* (2013.01); *G06F 3/04842* (2013.01); *G06F 16/24556* (2019.01); *G06F 16/26* (2019.01); *G06Q 10/103* (2013.01); *G06Q 10/1093* (2013.01); *G06Q 10/20* (2013.01); *G06Q 30/016* (2013.01)

(58) Field of Classification Search
CPC ......... G06F 16/26; G06F 16/2455; G06F 16/24556; G06F 3/04842; G06Q 10/063114; G06Q 10/06393; G06Q 10/103; G06Q 10/1093; G06Q 10/20; G06Q 30/016
USPC ...................................................... 705/7.15
See application file for complete search history.

(56) References Cited

U.S. PATENT DOCUMENTS

| | | | |
|---|---|---|---|
| 8,738,414 B1 * | 5/2014 | Nagar ............... | G06Q 10/101 705/7.25 |
| 2013/0151300 A1 * | 6/2013 | Le Chevalier ......... | G06Q 50/20 705/7.15 |
| 2014/0012886 A1 * | 1/2014 | Downing .............. | G06F 16/211 707/805 |
| 2014/0192970 A1 * | 7/2014 | Castellani ........ | G06Q 10/06398 379/265.06 |
| 2014/0282053 A1 * | 9/2014 | Hauschild ............. | G06F 3/0481 715/744 |

(Continued)

OTHER PUBLICATIONS

Folinas, Dimitris. "A conceptual framework for business intelligence based on activities monitoring systems." International Journal of Intelligent Enterprise 1.1, pp. 65-80. (Year: 2007).*

*Primary Examiner* — Charles Guiliano
*Assistant Examiner* — Letoria G Knight
(74) *Attorney, Agent, or Firm* — Brownstein Hyatt Farber Schreck, LLP

(57) ABSTRACT

A data engine may establish and maintain dynamic item subsets of items received from the item-tracking platforms. Users may define and customize the dynamic item subsets using a client application. The data engine may determine aggregated data about the dynamic item subsets for presentation in a graphical user interface of a client application executing on or otherwise accessible by the client devices.

20 Claims, 16 Drawing Sheets

(56) References Cited

U.S. PATENT DOCUMENTS

| | | | |
|---|---|---|---|
| 2016/0165003 A1* | 6/2016 | Blattner | H04L 51/043 |
| | | | 715/745 |
| 2016/0188134 A1* | 6/2016 | Azmoon | G06Q 10/103 |
| | | | 715/781 |
| 2016/0246490 A1* | 8/2016 | Cabral | G06F 3/0481 |
| 2017/0220633 A1* | 8/2017 | Porath | G06F 9/542 |
| 2018/0285433 A1* | 10/2018 | Pavon | H04L 41/142 |
| 2019/0080289 A1* | 3/2019 | Kreitler | G06Q 10/103 |
| 2019/0108074 A1* | 4/2019 | Pilkington | G06F 7/08 |
| 2019/0324630 A1* | 10/2019 | Schwartz | G06F 16/907 |

* cited by examiner

FIG. 4A

MULTI-PLATFORM DATA AGGREGATION AND AUTOMATION SYSTEM

TECHNICAL FIELD

Embodiments described herein relate to a multi-platform data aggregation and automation system, and, in particular, to systems and methods for providing unification, aggregation, visualization, and automation of data from multiple item-tracking platforms.

BACKGROUND

Item-tracking platforms are leveraged for a wide variety of personal and professional purposes. Item-tracking platforms may be used to coordinate projects, workflows, issue tracking, and other group activities. Within an organization or group, multiple discrete item-tracking platforms may be used. Different item-tracking platforms may present data in different ways that are not easily combined or compared. This may lead to inefficiencies in overseeing the activities that are coordinated using the item-tracking platforms.

SUMMARY

Embodiments of the systems, devices, methods, and apparatuses described in the present disclosure are directed to providing visualizations of aggregated data from multiple item-tracking platforms.

One embodiment may take the form of a computer-implemented method for defining a dynamic item subset associated with a set of issue-tracking platforms for visualizing data associated with the set of issue-tracking platforms. The computer-implemented method may include the step of instantiating a client application on a client device. The client application may be configured to provide a graphical user interface on display of the client device and define a user-defined tile of the graphical user interface by receiving, via the graphical user interface, an input regarding a selection of a set of item-tracking platforms, each issue-tracking platform of the set of issue-tracking platforms configured to track issues for a defined set of users, and one or more parameters for defining a dynamic item subset of items tracked by the set of issue-tracking platforms. The computer-implemented method may further include the step of, in response to defining the user-defined tile, establishing a data pipeline with each issue-tracking platform of the set of issue-tracking platforms. The computer-implemented method may further include the step of obtaining a source data set for each issue-tracking platform using a respective pipeline, each source data set having a respective native data object structure. The computer-implemented method may further include the step of defining a data cache of tracked data objects by extracting structured attributes from the respective native data object structures of each source data set. The computer-implemented method may further include the step of identifying items in the dynamic item subset by identifying a set of items in the data cache using the one or more parameters. The computer-implemented method may further include the step of determining aggregated data regarding the items in the dynamic item subset. The client application may be further configured to display a visualization of the aggregated data in the graphical user interface. The client application may be configured to display visualizations corresponding to multiple dynamic item subsets corresponding to multiple different sets of issue-tracking platforms Another embodiment may take the form of a computer-implemented method for generating a tile display in a graphical user interface for visualizing aggregated data for items from multiple item-tracking platforms. The computer-implemented method may include the steps of receiving, via a graphical user interface of a client application, a first request to create a first tile for display in a set of tiles in the graphical user interface and a second request to create a second tile for display in the set of tiles. The first tile may correspond to a first dynamic item subset of a first set of items of a first item-tracking platform. The second tile may correspond to a second dynamic item subset of a second set of items of a second item-tracking platform. The computer-implemented method may further include the steps of, in accordance with the first request, receiving, via the graphical user interface, one or more first parameters for defining the first dynamic item subset, accessing the first set of items, identifying items in the first dynamic item subset using the one or more first parameters, determining first aggregated data regarding the items in the first dynamic item subset, and generating the first tile, the first tile comprising the first aggregated data. The computer-implemented method may further include the steps of, in accordance with the second request, receiving, via the graphical user interface, one or more second parameters for defining the second dynamic item subset, the second set of items, identifying items in the second dynamic item subset using the one or more second parameters, determining second aggregated data regarding the items in the second dynamic item subset, and generating the second tile, the second tile comprising the second aggregated data. The computer-implemented method may further include the step of displaying the first tile and the second tile in the graphical user interface.

Another embodiment may take the form of a computer-implemented method for generating a set of tiles for display in a graphical user interface of a client application. The computer-implemented method may include the steps of providing a graphical user interface using a client application client application on a client device and receiving, via the graphical user interface, an indication of a set of issue-tracking platforms. Each issue-tracking platform of the set of item-tracking platforms may be configured to track issues for a defined set of users. The computer-implemented method may further include establishing a data pipeline with each issue-tracking platform of the set of issue-tracking platforms, obtaining a source data set for each issue-tracking platform using a respective pipeline, each source data set having a respective native data object structure, and defining a data cache of tracked data objects by extracting structured attributes from the respective native data object structures of each source data set. The computer-implemented method may further include the steps of, receiving, via the graphical user interface, one or more parameters for defining a dynamic item subset comprising issues tracked by the set of issue-tracking platforms, identifying issues in the dynamic item subset by identifying a set of issues in the data cache using the one or more parameters, and determining aggregated data regarding the items in the dynamic item subset. The computer-implemented method may further include the step of generating, for display in the graphical user interface, a set of tiles. Each tile of the set of tiles may correspond to a respective dynamic item subset. Each tile of the set of tiles may display the aggregated data for the respective dynamic item subset. The computer-implemented method may further include the step of displaying the set of tiles in the graphical user interface.

In addition to the example aspects and embodiments described above, further aspects and embodiments will become apparent by reference to the drawings and by study of the following description.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 4A-4E depict an example graphical user interface that includes a data visualization dashboard that may be provided as a result of instantiating or executing a graphical client application on a client device;

The use of the same or similar reference numerals in different figures indicates similar, related, or identical items.

Figure 1:
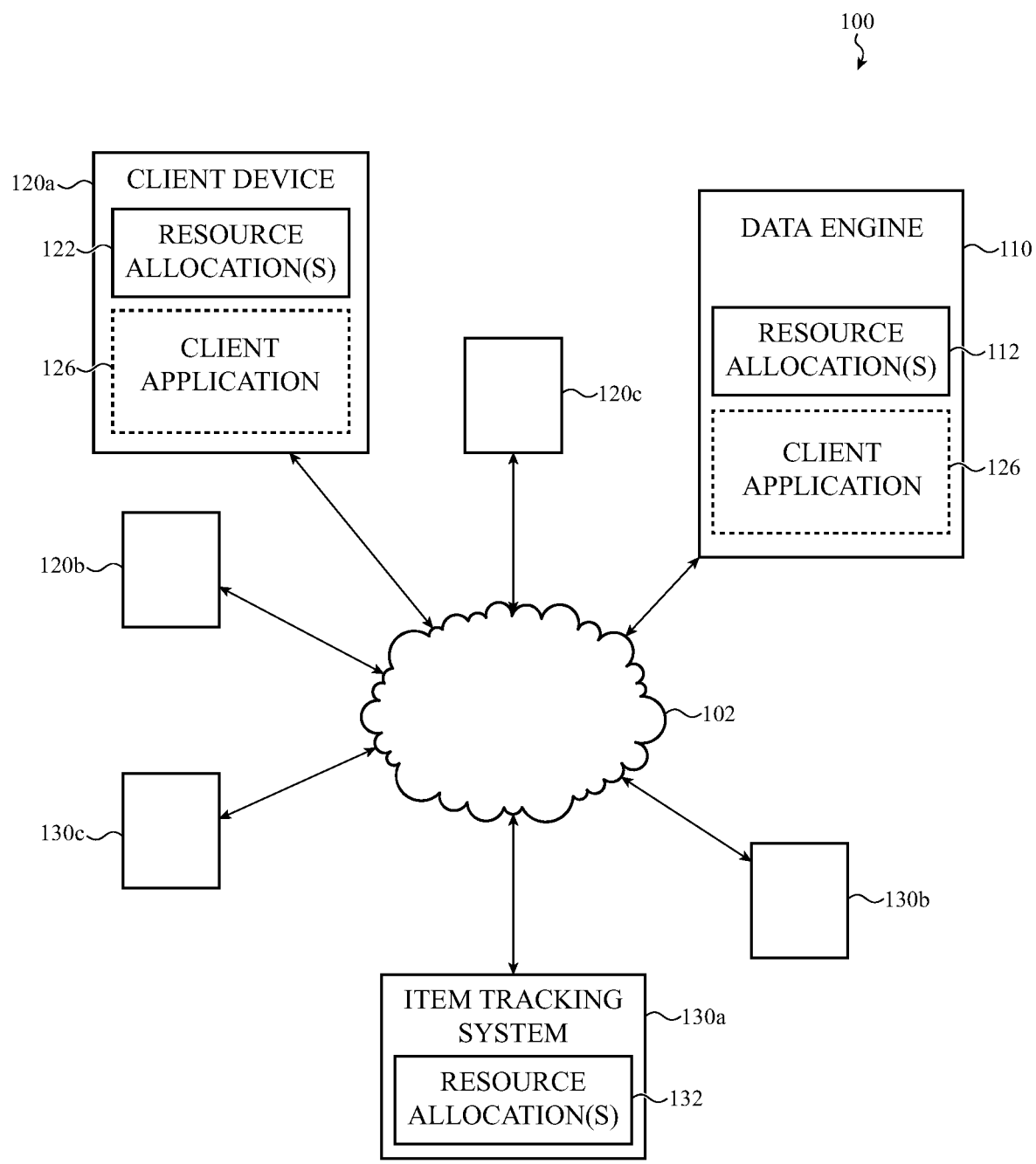
FIG. 1 depicts a system for visualizing data associated with the discrete item-tracking platforms.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for providing visualizations of aggregated data from multiple item-tracking platforms.

A data engine may aggregate data from multiple different item-tracking platforms, and may initiate automation based on the data and/or provide visualization(s) of the data in a user interface. The data engine may establish and maintain dynamic item subsets of items received from the item-tracking platforms. Users may define and customize the dynamic item subsets using a client application. The data engine may determine aggregated data about the dynamic item subsets for presentation in a graphical user interface of a client application executing on or otherwise accessible by the client devices. Additionally or alternatively, the aggregated data may trigger one or more actions to be performed in response to determined characteristics and/or changes to the data.

The client application may provide the data engine may be communicably coupled to one or more item-tracking platforms. Each item-tracking platform may be an entity that hosts software applications and content for tracking items for a defined set of users. Each item-tracking platform may include one or more servers for hosting corresponding software application(s) and one or more storage devices for storing application specific data. Examples of software applications hosted by item-tracking platforms may include issue-tracking applications (e.g., JIRA), task and project management applications (e.g., TRELLO, ASANA, MICROSOFT PLANNER), spreadsheet applications (e.g., GOOGLE SHEETS), software code management systems (e.g., BITBUCKET, GITHUB).

The client application may receive parameters for defining the dynamic item subsets from users, for example via a graphical user interface of the client application, and may provide the parameters to the data engine for use in the filters. The parameters may include values for certain structured attributes (e.g., data fields) associated with the items of the subset of item-tracking platforms. For example, users may specify that items in the dynamic item subset must belong to specified groups, boards, or projects, have specified dates or deadlines, be associated with specified people, and the like. Users may specify multiple parameters for a dynamic item subset.

As noted above, the data engine may analyze dynamic item subsets to determine aggregated data regarding the dynamic item subsets. Aggregated data may include statistics and other information regarding one or more data fields of multiple items of the dynamic item subsets. As items of a dynamic item subset change, the visualization engine may compute updated aggregated data. Aggregated data may include mathematical averages (e.g., mean, median, mode, etc.), sums of data field values, maximum and minimum values, counts of items, and the like. Aggregated data may be computed for the entire dynamic item subset or for items of the subset satisfying specified criteria.

Each item-tracking platform may define its own unique set of data objects that are incompatible with data objects from other platforms. Data objects may include items, structured attributes (e.g., data fields) that make up items, groupings of items, and the like. Data objects for each item-tracking platform may be stored according to a native data object structure corresponding to the platform. The data objects themselves and/or the native data object structures of different item-tracking platforms may be incompatible with one another such that data objects from one platform cannot be integrated into the native data object structure of another platform. As an example, the data fields corresponding to items may vary across different item-tracking platforms, and even across different items of the same item-tracking platform. Similarly, the manner in which data fields corresponding to items are presented varies across different tracking platforms. As a result, comparing sets of items across different item-tracking platforms is difficult when using the item-tracking platforms themselves. The data engine allows users of a client application to view aggregated data regarding items from multiple different item-tracking platforms in a uniform manner that makes cross-platform comparisons easier and more informative.

Changes in the dynamic item subsets may trigger one or more workflow rules (e.g., automations) maintained by the data engine. Workflow rules may cause the data engine to perform actions in response to certain changes to the dynamic item subsets. A workflow rule may consist of a trigger (e.g., a change or condition of the dynamic item subset) and an action to perform in response to the trigger. Examples of triggers include reaching a threshold for a count of items (e.g., total count and/or a count of items satisfying specified criteria), adding or removing item(s) from a dynamic item subset (e.g., creating or deleting items, changing structured attributes associated with items that result in the items being to be added or removed from one or more dynamic item subsets, etc.). Actions may include performing certain operations within the client application, such as providing a notification, changing formatting within a graphical user interface (e.g., changing a size, color or other formatting of at least part of a tile or visualization), animating (e.g., causing to move) at least part of a tile or visualization element, or the like. Actions may additionally or alternatively include performing operations or causing operations to be performed outside of the client application, including sending notifications, messages, or other data to one or more software applications or platforms (e.g., sending an email, a SLACK message, or the like).

The aggregated data may be used to create visualizations for presentation using the client application. Visualizations may include graphical representations of the determined aggregated data, including charts and other graphical elements for representing aggregated data visually. Visualizations may be displayed as part of data visualization dashboards provided by the client application.

These foregoing and other embodiments are discussed below with reference to FIGS. 1-8. However, those skilled in the art will readily appreciate that the detailed description given herein with respect to these figures is for explanation only and should not be construed as limiting.

FIG. 1 depicts a system 100 configured to define dynamic item subsets associated with discrete item-tracking platforms for visualizing data associated with the discrete item-tracking platforms. In the illustrated example embodiment, the system 100 includes a data engine 110, which is communicably coupled to a one or more client devices 120*a-c* and one or more item-tracking platforms 130*a-c*. The system 100 also includes one or more networks 102 that enable communication between the various components of the system 100.

As noted above, the data engine 110 may be communicably coupled to one or more item-tracking platforms 130*a-c*. Each item-tracking platform 130*a-c* may be an entity that hosts software applications and content for tracking items for a defined set of users. Each item-tracking platform 130*a-c* may include one or more servers for hosting corresponding software application(s) and one or more storage devices for storing application specific data. Examples of software applications hosted by item-tracking platforms 130*a-c* may include issue-tracking applications (e.g., JIRA), task and project management applications (e.g., TRELLO, ASANA, MICROSOFT PLANNER), spreadsheet applications (e.g., GOOGLE SHEETS), software code management systems (e.g., BITBUCKET, GITHUB). It will be appreciated that the software applications need not be offered by the same organization and that the presently disclosed invention can be used with any product platform configured to interact with the data engine 110.

As noted above, each item-tracking platform 130*a-c* may host software applications and content for tracking items for a defined set of users. The items tracked by the item-tracking platforms may be issues, support tickets, tasks or projects, spreadsheet entries, and the like. The content associated with each item may include set of structured attributes (e.g., data fields) corresponding to the item, including an item name or title, item dates (e.g., deadlines, start dates, creation dates), users assigned to or otherwise associated with the item, teams or groups associated with the item, comments, files (e.g., images, documents), and/or one or more additional fields related to the item (e.g., deal size for a sales task, bug count for a software project, etc.).

In some cases, an item-tracking platform may be an issue-tracking platform. An "issue-tracking platform," as described herein, may be used to refer to a project management system or tool that can be implemented in whole or in part as software executed by a virtual, containerized, or physical server or other computing appliance or combination of appliances that provides a team of individuals with a means for communicating and exchanging information with one another. The issue-tracking platform may be used to track the status of issues within a project or organization. Examples of issues include tasks, problems (e.g., software bugs, support tickets), and the like. In many examples, an issue-tracking platform is configured for use by a software development team to exchange information that can facilitate the completion and assignment of discrete tasks related to software development projects from creation of new user stories (e.g., user-perspective feature requests or desired functionality), through proof of concept testing, through integration testing, through release of software to one or more users, and through reporting and fixing of software errors or inefficiencies ("bugs").

In many examples, an issue-tracking platform, however configured or used by a team of individuals or an organization, is implemented with a client-server architecture in which a host server or service of the issue-tracking platform exchanges requests and responses (which may comply with a communication protocol such as HTTP, TCP, UDP, and the like), with one or more client devices, each of which may be operated by a user of the issue-tracking platform. In other cases, event-driven architectures may be used. In this manner, a host server of an issue-tracking platform can serve information to each client device, and in response, each client device can render a graphical user interface on a display to present that information to the user of that respective client device.

Each item-tracking platform may define its own unique set of data objects that are incompatible with data objects from other platforms. Data objects may include items, structured attributes (e.g., data fields) that make up items, groupings of items, and the like. Data objects for each issue-tracking platform may be stored according to a native data object structure corresponding to the platform. The data objects themselves and/or the native data object structures of different issue-tracking platforms may be incompatible with one another such that data objects from one platform cannot be integrated into the native data object structure of another platform. As an example, the data fields corresponding to items may vary across different item-tracking platforms 130*a-c*, and even across different items of the same item-tracking platform 130*a-c*. Similarly, the manner in which data fields corresponding to items are presented varies across different item-tracking platforms 130*a-c*. As a result, comparing sets of items across different item-tracking platforms 130*a-c* is difficult when using the item-tracking platforms themselves. The data engine 110 allows users of a client application 126 to view aggregated data regarding items from multiple different item-tracking platforms 130a-c in a uniform manner that makes cross-platform comparisons easier and more informative.

The data engine 110 establishes and maintains dynamic item subsets of items received from the item-tracking platforms 130a-c. Users may define and customize the dynamic item subsets using the client application 126. The data engine 110 may determine aggregated data about the dynamic item subsets for presentation in a graphical user interface of a client application 126 executing on or otherwise accessible by the client devices 120a-c.

Client device 120a is described in detail herein. The other client devices 120b and 120c may be the same as or similar to the client device 120a. The client device 120a may execute or otherwise access an instance of a client application 126. The client application 126 may generate and/or provide graphical user interfaces at the client device 120a. The graphical user interfaces may include one or more data visualizations, data visualization dashboards and/or tile interfaces as discussed in more detail with respect to FIGS. 3-4E. The graphical user interfaces may additionally or alternatively include one or more interfaces for receiving user inputs for defining dynamic item subsets and/or creating or modifying workflow rules, as described in more detail with respect to FIGS. 5A-6B.

The client application 126 may be defined by executable code or instructions stored in a persistent memory of the client device 120a. A processor of the client device 120a can be communicably coupled to the persistent memory and can access the persistent memory to load at least a portion of the executable code or instructions into a working memory in order to instantiate the client application 126. Additionally or alternatively, some or all of the client application 126 may be executed by a remote computing device (e.g., a server of the data engine 110) that is communicably coupled to the client device 120a. The client device 120a may execute a software application, such as a web browser or other application, configured to access the client application 126.

It is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, each engine or system of the system 100 of FIG. 1 can be implemented in a number of suitable ways. As illustrated, the data engine 110, the client devices 120a-c, and the item-tracking platforms 130a-c each include one or more purpose-configured components, which may be either software or hardware. In particular, it may be appreciated that although these functional elements are identified as separate and distinct devices (e.g., servers) that can each include allocations of physical or virtual resources (identified in the figure as the resource allocations 112, 122, and 132 respectively), such as one or more processors, memory, and/or communication modules (e.g., network connections and the like), that such an implementation is not required. More generally, it may be appreciated that the various functions described herein can be performed by any suitable physical hardware, virtual machine, containerized machine, or any combination thereof. An example implementation of hardware for implementing the system 100 is described below with respect to FIG. 8.

Figure 2:
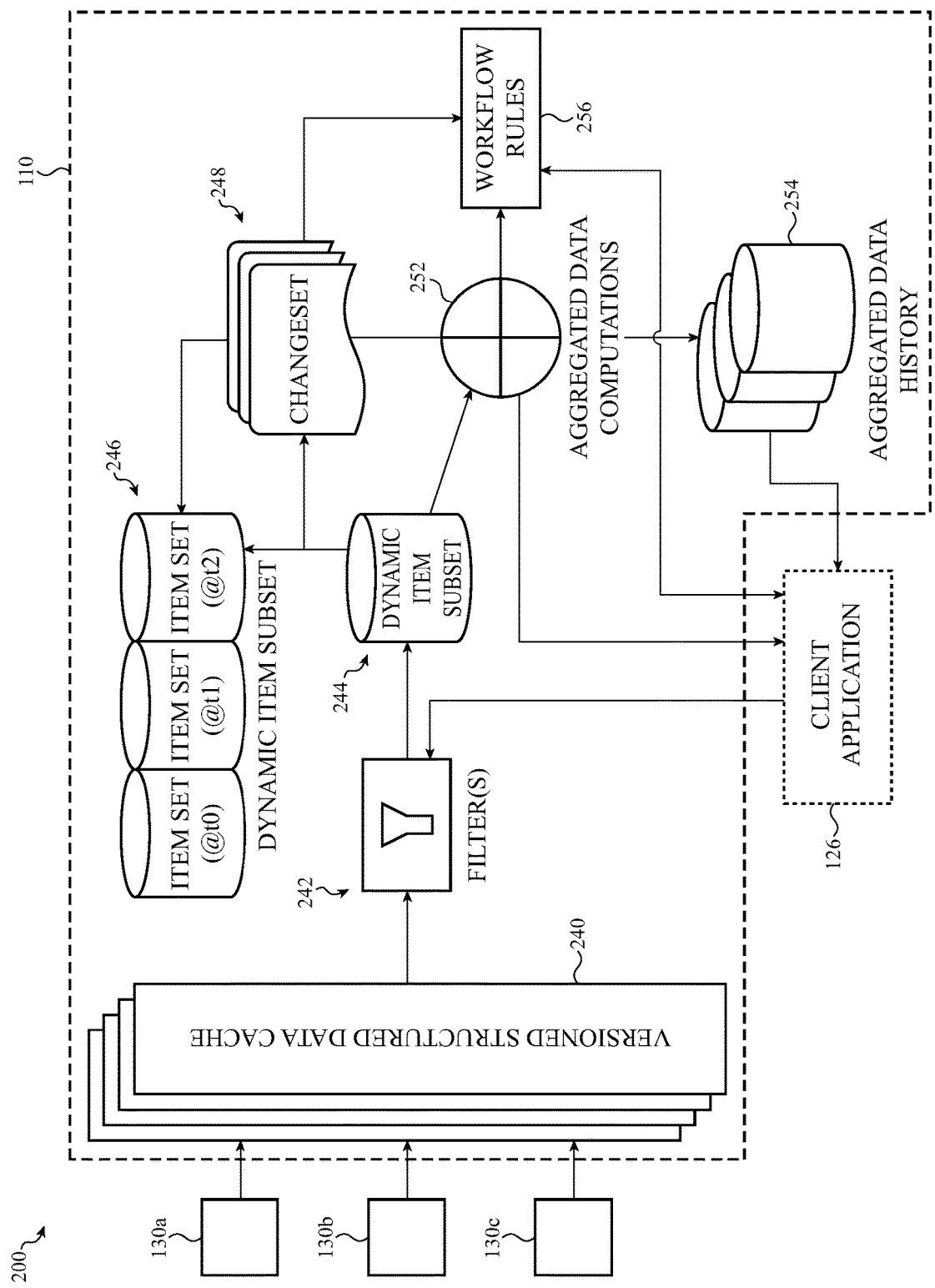
FIG. 2 depicts an example data flow diagram showing an example flow of data through the system of FIG. 1.

FIG. 2 depicts an example data flow diagram 200 showing an example flow of data through the system 100 of FIG. 1. In the example of FIG. 2, the data engine 110 obtains items from the item-tracking platforms 130a-c. Obtaining an item may refer to receiving and/or retrieving a source data set that includes some or all of the structured attributes (e.g., data fields) or other content associated with the item and/or receiving updates or changes to structured attributes or content associated with the item. The data engine 110 may establish a data pipeline with each item-tracking platform 130a-c for obtaining items from the item-tracking platforms. The data pipeline may be any suitable connection for data to flow between the item-tracking platforms 130a-c and the data engine 110. In some cases, the data engine 110 obtains items at regular intervals. Additionally or alternatively, the data engine 110 may obtain items upon requests made to the item-tracking platforms 130a-c. Additionally or alternatively, the item-tracking platforms 130a-c may make items available to the data engine 110 via an API or other interface. In some cases, the data engine 110 detects or is notified of changes to one or more items at the item-tracking platforms 130a-c and obtains items in response to those changes.

The data engine 110 may establish a data pipeline or access a preexisting data pipeline in response to defining a user-defined tile of the graphical user interface of the client application 126. Defining the user-defined tile may include receiving an input regarding a selection of a set of item-tracking platforms 130a-c and one or more parameters for defining a dynamic item subset of the items tracked by the set of item-tracking platforms.

In some cases, the data engine 110 may store one or more sets of items received from the item-tracking platforms 130a-c in a versioned structured data cache 240 of tracked data objects (e.g., items, structured attributes, groups of items, etc.). In various embodiments, the data engine 110 may store items according to any suitable storage schemes or techniques. As noted herein, each item-tracking platform 130a-c may have a different native data object structure. As a result, the source data sets obtained from different item-tracking platforms 130a-c may have different native data object structures. The data engine 110 may define the data cache by extracting structured attributes from the respective native data object structures of each source data set for storage in a common data object structure of the data cache. The data engine 110 may identify structured attributes that are common across different source data sets and/or which correspond to structured attributes in other source data sets. In some cases, the data engine 110 identifies and extracts structured attributes that correspond to structured attributes or data fields of the data cache. Once items are in the structured data cache, they may be identified as items belonging to one or more dynamic item subsets. By extracting structured attributes and defining a structured data cache, the data engine 110 allows items from different item-tracking platforms 130a-c to be stored such that they are compatible with one another and can belong to the same dynamic item subsets. As a result, aggregated data may be determined for items from multiple different item-tracking platforms 130a-c.

As part of defining a dynamic item subset for a user-defined tile, the data engine 110 may obtain items from the set of item-tracking platforms for defining a data cache and identifying items of the dynamic items subset from the data cache. The data engine 110 may apply one or more filters 242 to the data from the versioned structured data cache 240 to define one or more dynamic item subsets 244. In some cases, parameters for the filters 242 are defined by users using the client application 126. The client application 126 may receive parameters for defining the dynamic item subsets 244 from users, for example via a graphical user interface of the client application, and may provide the parameters to the data engine 110 for use in the filters 242.

The parameters may include values for certain structured attributes (e.g., data fields) associated with the items of the subset of item-tracking platforms. The structured attributes may be extracted from source data sets from each item-tracking platform as described above. For example, users may specify that items in the dynamic item subset must belong to specified groups, boards, or projects, have specified dates or deadlines, be associated with specified people, and the like. Users may specify multiple parameters for a dynamic item subset.

As shown in FIG. 2, the data engine 110 may maintain a dynamic item subset history 246, which includes versions of each dynamic item subset 244 at different times. The data engine 110 may establish and maintain one or more changesets 248 for a dynamic item subset 244 by comparing a dynamic item subset with previous and/or subsequent versions of the dynamic item subset. The changeset 248 may be a ledger, log, or other data structure that indicates the changes to the dynamic item subset 244 across two or more versions of the dynamic item subset. The changes reflected in the changeset 248 may include items being added or removed from the dynamic item subset 244 and/or changes to individual structured attributes of items in the dynamic item subset. The changeset 248 may be stored with the dynamic item subset history 246. In some cases, the dynamic item subset history 246 may include one or more changesets 248 regarding the dynamic item subset history 246 in addition to or alternatively to storing the actual items of the dynamic item subset versions.

As noted above, the data engine 110 may analyze dynamic item subsets 244 and/or changesets 248 to determine aggregated data 252 regarding the dynamic item subsets. Aggregated data may include statistics and other information regarding one or more structured attributes of multiple items of the dynamic item subsets. As items of a dynamic item subset change, the data engine 110 may compute updated aggregated data. Aggregated data may include mathematical averages (e.g., mean, median, mode, etc.), sums of data field values, maximum and minimum values, counts of items, and the like.

Aggregated data may be computed for the entire dynamic item subset or for items of the subset satisfying specified criteria. The specified criteria may include certain structured attributes, such as data fields (e.g., items that include a "cost" data field). Specified criteria may additionally or alternatively include certain values within structured attributes, including items that are associated with or assigned to specified people, groups, projects, boards, or the like; items that have deadlines or dates within specified ranges; and the like.

As an example, the data engine 110 may determine a total number of items in a dynamic item subset, an average of "cost" values for items in the subset that include a "cost" data field, a number of items created, modified, completed, assigned, or the like, within a specified period (e.g., the last week, the last year, etc.), a number of items in the dynamic item subset that are associated with one or more users or people, and/or a number of items in the dynamic item subset that are associated with one or more projects, boards, groups, or the like. Example aggregated data is discussed in more detail below with respect to FIGS. 3-4E. The aggregated data 252 may be stored in an aggregated data history 254. The data engine 110 may be configured to compare or otherwise analyze the aggregated data 252 over time, and may present visualizations that include trends of the aggregated data over time.

The changesets 248 and/or the aggregated data 252 may trigger one or more workflow rules 256 maintained by the data engine 110. Workflow rules 256 may allow the data engine 110 to perform actions in response to certain changes to the dynamic item subsets. A workflow rule may consist of a trigger (e.g., a change or condition of the dynamic item subset) and an action to perform in response to the trigger. Examples of triggers include reaching a threshold for a count of items (e.g., total count and/or a count of items satisfying specified criteria), adding or removing item(s) from a dynamic item subset (e.g., creating or deleting items, changing data fields associated with items that result in the items being to be added or removed from one or more dynamic item subsets, etc.). Actions may include performing certain operations within the client application, such as providing a notification, changing formatting within a graphical user interface (e.g., changing a size, color or other formatting of at least part of a tile or visualization), animating (e.g., causing to move) at least part of a tile or visualization element, or the like. Actions may additionally or alternatively include performing operations or causing operations to be performed outside of the client application, including sending notifications, messages, or other data to one or more software applications or platforms (e.g., sending an email, a SLACK message, or the like). Workflow rules may be created and/or modified using the client application, as discussed in more detail below with respect to FIGS. 6A-6B.

The aggregated data 252, the aggregated data history 254, and/or the workflow rules 256 may be used to create visualizations for presentation using the client application 126. Visualizations may include graphical representations of the determined aggregated data, including charts and other graphical elements for representing aggregated data visually. Visualizations may be displayed as part of data visualization dashboards provided by the client application 126. The data visualization dashboards may include one or more visualizations that correspond to aggregated data for one or more dynamic item subsets. In some cases visualizations and/or data visualization dashboards may be embedded or otherwise integrated within graphical user interfaces of other applications besides the client application. Example visualizations and data visualization dashboards are described with respect to FIGS. 3-4E below.

FIGS. 3-6B depict an example client device 320 executing or otherwise accessing an instance of a client application configured to provide visualizations of aggregated data from multiple item-tracking platforms, such as described herein. The client device 320 includes a housing 328 that encloses and supports a display 340. The display 340 can be leveraged by the instance of the client application to generate graphical user interfaces. Although each of these figures illustrates the example client device 320 as a desktop computer, it may be appreciated that this is merely one example. In other configurations and/or architectures, other electronic devices can be used including mobile devices, tablet devices, and wearable devices.

For simplicity of illustration, the client device 320 is depicted without a processor, a working memory, or a persistent memory; it may be appreciated however that such components (also referred to as resource allocations with reference to FIG. 1) may be included within the housing 328 or in another location.

The graphical user interfaces rendered by the client application are configured to present information related to items from multiple item-tracking platforms. The graphical user interfaces may present visualizations of aggregated data for one or more dynamic item subsets as described herein. In some cases, the client application presents visualizations for multiple dynamic item subsets in a single graphical user interface. For example, the example embodiment shown in FIG. 3 a graphical user interface 300 may include a set of tiles 360a-c, each corresponding to a different dynamic item subset. The dynamic item subsets may include items and related data from a subset of item-tracking platforms of a set of item-tracking platforms, and each dynamic item subset may be associated with a different subset of item-tracking platforms.

Figure 3:
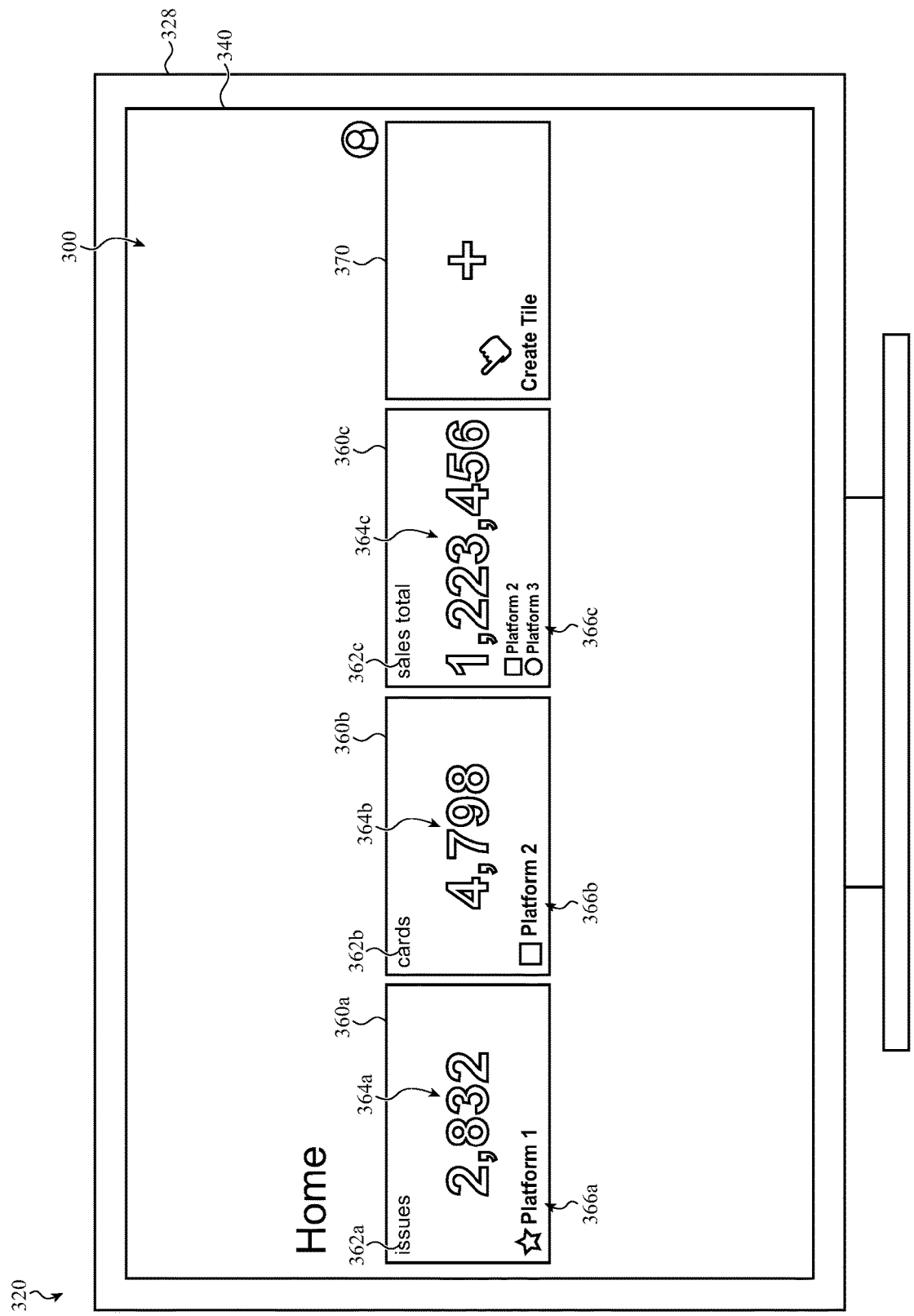
FIG. 3 depicts an example client device executing or otherwise accessing an instance of a client application configured to provide visualizations of aggregated data from multiple item-tracking platforms.

Each of the tiles 360a-c may include one or more visualizations of aggregated data for the corresponding dynamic item subset. For example, as shown in FIG. 3, the tile 360a may include a visualization 364a that includes a count of a number of items (issues) in the dynamic item subset associated with the tile 360a; the tile 360b may include a visualization 364b that includes a count of a number of items (cards) in the dynamic item subset associated with the tile 360b; and the tile 360c may include a visualization 364c that includes a statistic (e.g., an sum, an average, etc.) regarding a data field (e.g., sales totals) of the items in the dynamic item subset associated with the tile 360c. Each of the tiles 360a-c may include a descriptor element 362a-c that describes the visualization(s) of that tile.

Each tile 360a-c may include a platform element 366a-c that indicate the item-tracking platform(s) from which items in the respective dynamic item subset are received. The platform elements 366a-c may include a descriptor (e.g., a name) of the platform(s) or of board(s) or group(s) within the platform and one or more logos or icons associated with the platform(s). In the example of FIG. 3, the tile 360a includes items from a first item-tracking platform, and includes a first platform element 366a; the tile 360b includes items from a second item-tracking platform, and includes a second platform element 366b; and the third tile 360c includes items from a third item-tracking platform, and includes a third platform element 366c.

In some cases, the workflow rules described herein may result in graphical or visual changes to the tiles 360a-c. As an example, an action associated with a workflow rule may be an animation sequence or dynamic graphical output to indicate a change within a dynamic item subset. This may include changing the formatting, color, size, or other attributes of the tile 360a-c corresponding to the dynamic item subset within the graphical user interface. These changes may be an animation or dynamic change to draw a user's attention to the change. In some cases, different triggers for workflow rules may result in different animation sequences or dynamic graphical outputs. Triggers for workflow rules may be designated as positive triggers (e.g., indicating increased productivity, improved results, or any other change designated as positive) and/or negative triggers (e.g., indicating reduced productivity, negative results, or any other change designated as negative). In some cases, the animation sequence or dynamic graphical output may simulate a compression or inward progressing animation for negative triggers and an expansion or outward progressing animation for positive triggers. Other examples include using different colors or formatting based on whether a trigger is positive or negative.

The graphical user interface 300 may further include a create element 370, which may be selected to create a dynamic item subset, and an associated tile and/or a data visualization dashboard. In response to a selection of the create element 370, the graphical user interface may present a list that includes a set of item-tracking platforms whose items may be included in the dynamic item subset, as discussed in more detail with respect to FIG. 7 below.

As noted herein, the graphical user interfaces presented by the client application may further include a data visualization dashboard graphical user interface that may display multiple visualizations corresponding to tone or more dynamic item subsets. FIGS. 4A-4E depict an example graphical user interface 400 that includes a data visualization dashboard that may be provided as a result of instantiating or executing a graphical client application on a client device. In some cases, the graphical user interface 400 may be displayed in response to a selection of a tile 360a-c of the graphical user interface 300 (e.g., via a click, tap, or other input to the graphical user interface). The data visualization dashboard may present data visualizations corresponding to the dynamic item subset associated with the selected tile 360a-c. The data visualizations may be determined from the structured attributes extracted from the source data sets and stored in the data cache. Each dynamic item subset may include items from multiple different item-tracking platforms. As a result, the data visualizations may depict aggregated data for items from multiple different item-tracking platforms within a single graphical user interface (e.g., within a single screen or dashboard).

Figure 4A:
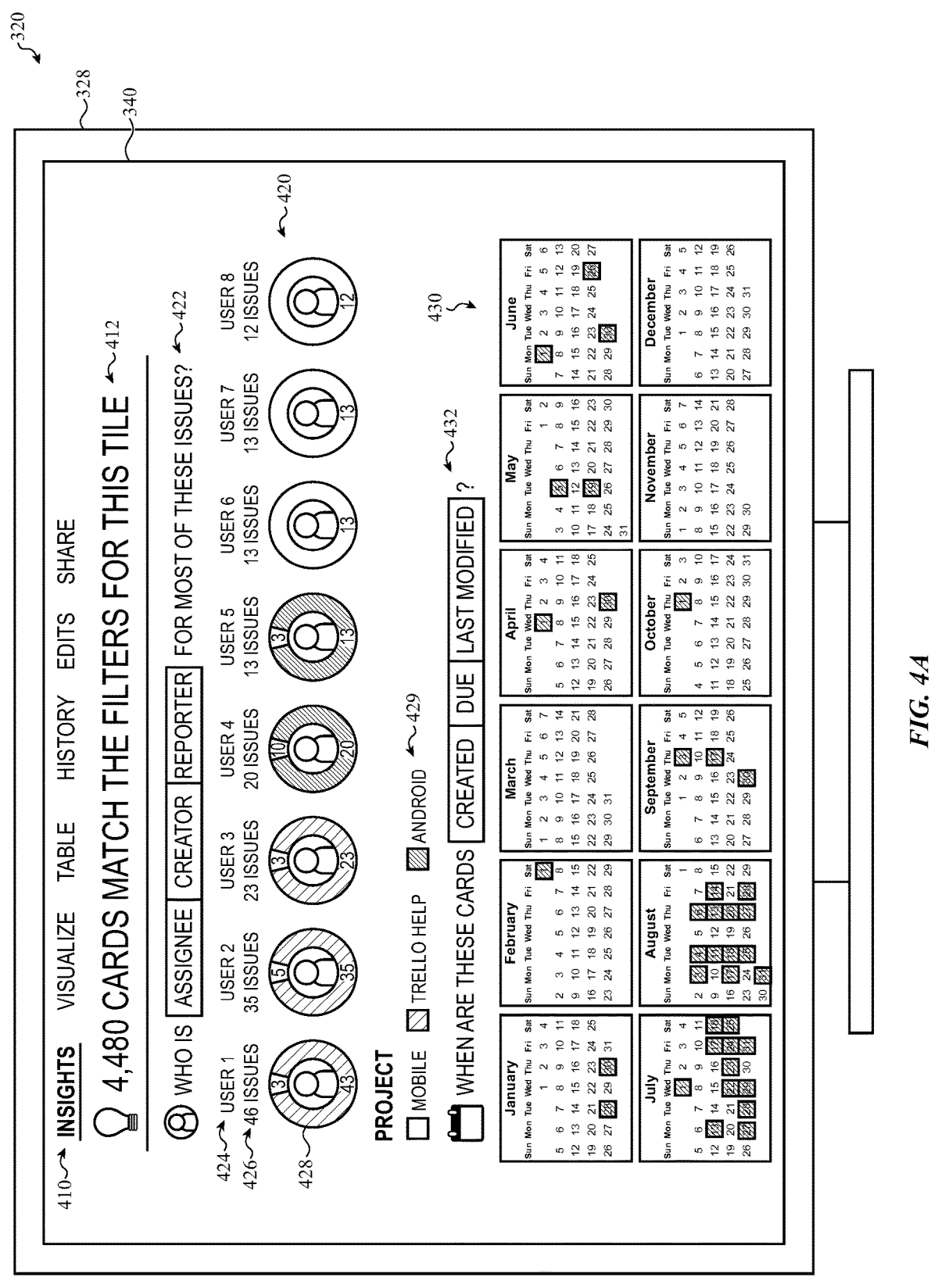

As shown in FIG. 4A, the data visualization dashboard of the graphical user interface 400 may include a navigation region 410, which includes navigation elements for displaying different portions of the graphical user interface. The data visualization dashboard of the graphical user interface 400 may include an insights region 412 in which aggregated data regarding the corresponding dynamic item subset is provided. This may include, for example, a number of items in the dynamic item subset, as shown in FIG. 4A.

The data visualization dashboard of the graphical user interface 400 may include a people visualization 420 that displays aggregated data regarding people related to the items in the dynamic item subset. Users may have different associations with items. For example, users may be assigned to items, creators of items, reporters on items, and the like. The people visualization 420 may include a selection element 422 in which a user may select the associations (e.g., data fields) that should be included in the visualization. The people visualization 420 may include graphical elements 424 corresponding to users associated with the items in the dynamic item subset. The graphical elements 424 may include a descriptor that identifies the user (e.g., displays the user's name, user name, or other identifier) and a number of items 426 having the selected association(s) with the user. The graphical elements 424 may further include a photograph, avatar, or icon associated with each user 428. The graphical elements 424 may further include a chart element that indicates a breakdown of the items associated with the user by another category (e.g., data field), such as project, group, board, or the like. The people visualization 420 may include a legend 429 for interpreting the chart elements.

The data visualization dashboard of the graphical user interface 400 may include a date visualization 430 that displays date information regarding the items in the dynamic item subset. The date visualization 430 may include one or more calendars (e.g., a weekly, monthly or yearly calendar) with dates related to items in the dynamic item subset highlighted or otherwise indicated. The date visualization 430 may include a selection element 432 that may be used to select the types of dates to be included in the date visualization. For example, users may choose to display when items were created, when items are due, and/or when items were last modified. In some cases, certain dates have multiple items associated with that date. The date visualization may provide an indication of the number of items associated with a date, for example by providing a darker highlight for dates with more items.

Figure 4B:
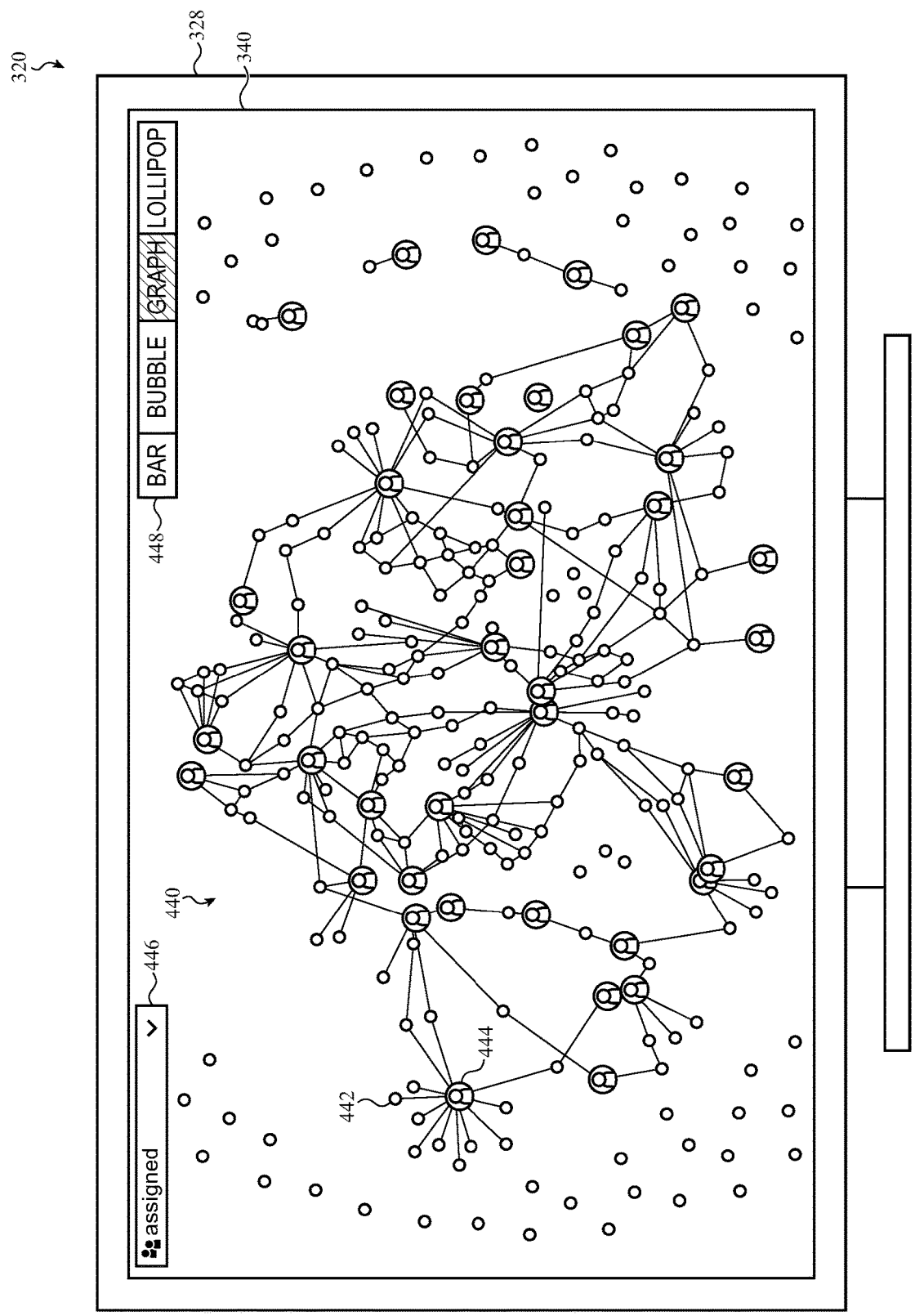
Figure 4C:
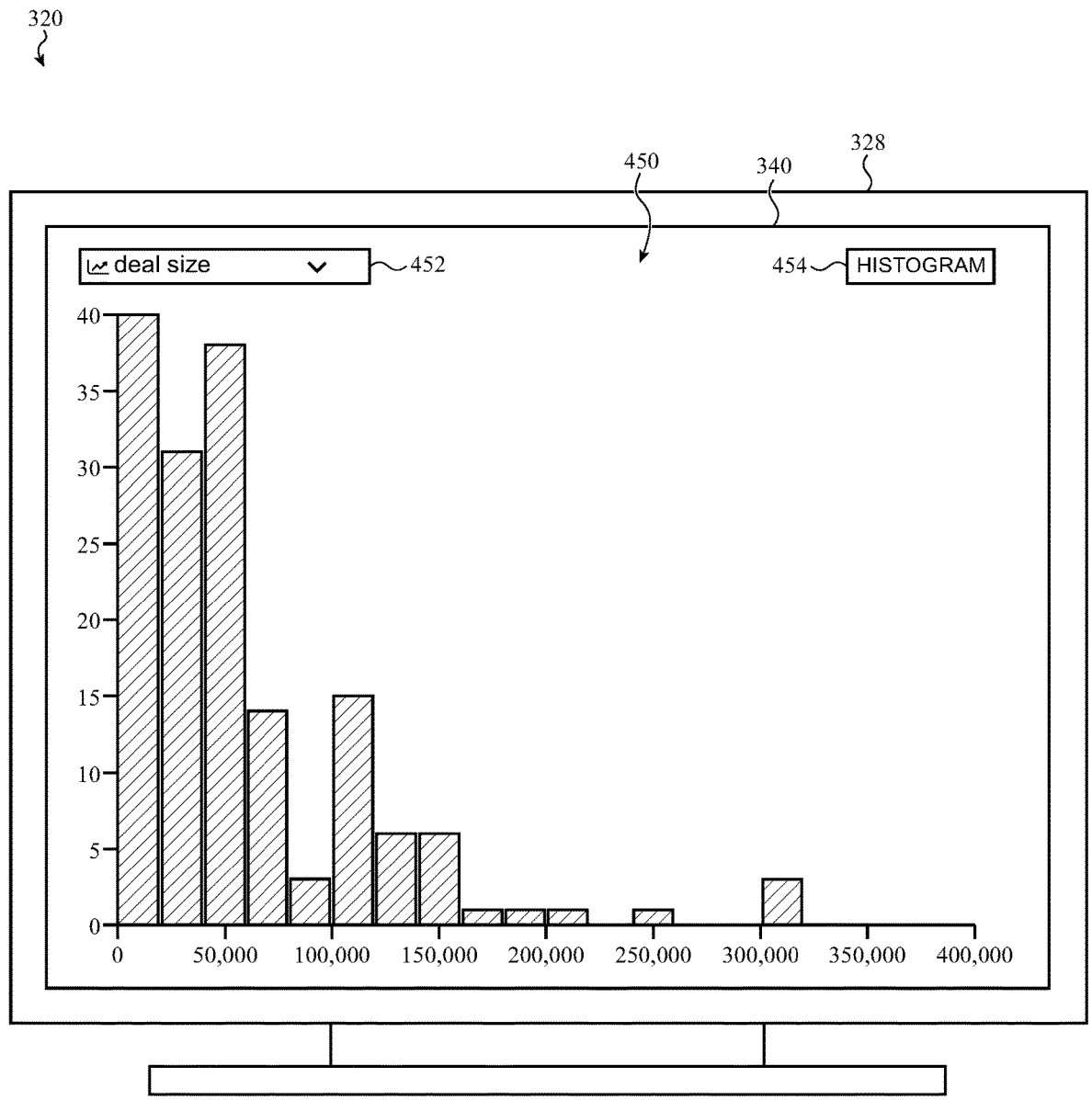

Turning to FIGS. 4B and 4C, the data visualization dashboard of the graphical user interface 400 may include one or more chart visualizations 440 and 450. As shown in FIG. 4B, the chart visualization 440 may include a cluster diagram that includes graphical elements 442 representing items and graphical elements 444 representing users. Connectors between the graphical elements 442 and 444 indicate associations between users and items. The cluster diagram may show which users have associations with common items, as well as items that are not associated with people and vice versa. The chart visualization 440 may include a selection element 446 for choosing the associations to be represented by the cluster diagram and a selection element 448 for selecting a different chart type for the chart visualization 440. As shown in FIG. 4C, the chart visualization 450 may include a histogram indicating a distribution of data field values among the items in the dynamic item subset. The chart visualization may include a selection element 452 for selecting from among different data fields for presentation in the chart visualization 450 and a selection element 454 for selecting from among different chart types for the chart visualization 450. As noted herein, the dynamic item subset may include items from multiple different item-tracking platforms. As a result, the data visualizations may depict aggregated data for items from multiple different item-tracking platforms within a single graphical user interface (e.g., within a single screen or dashboard). The chart visualization 440 may provide a graphical depiction of a graph-node relation across multiple different item-tracking platforms.

Figure 4D:
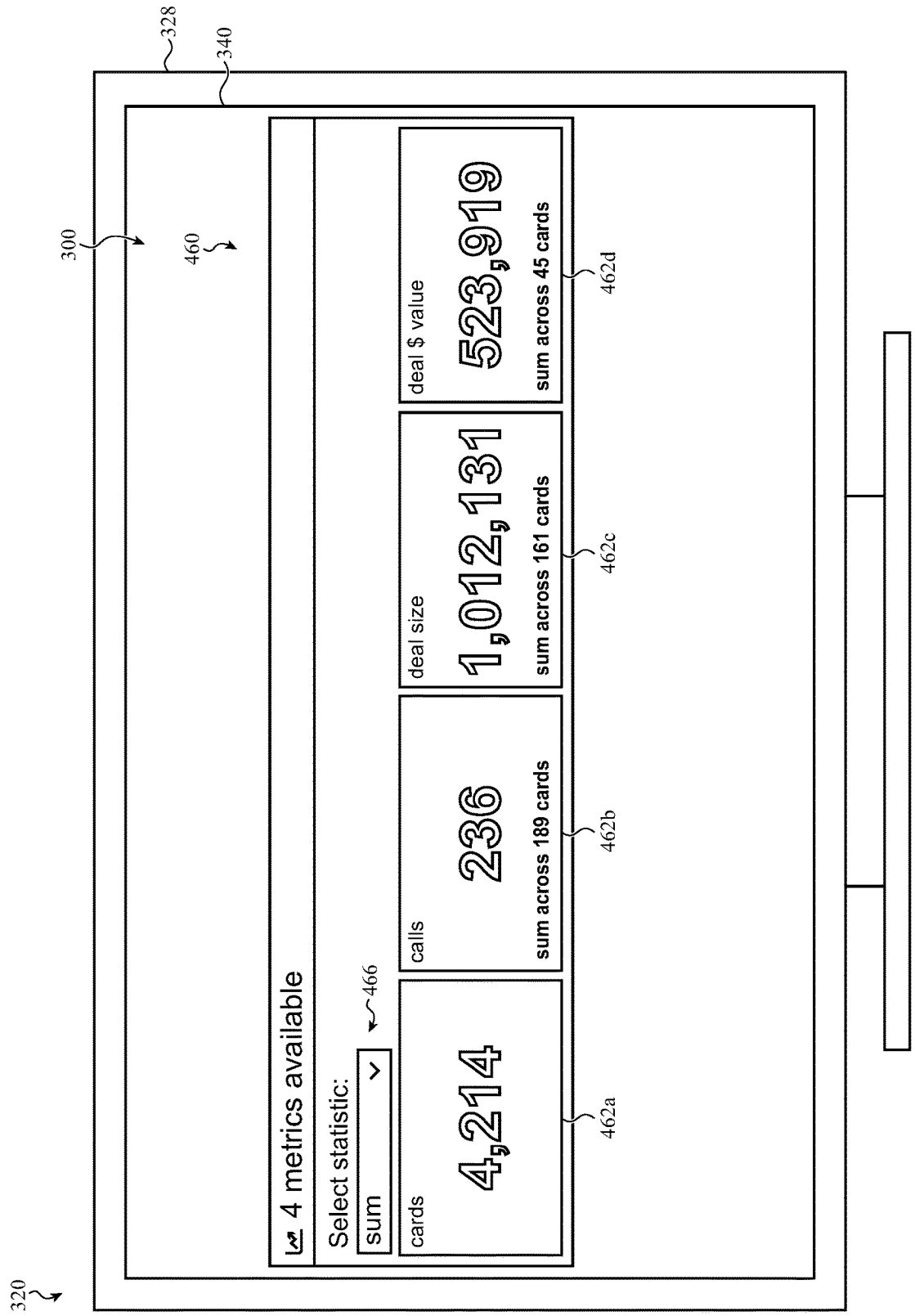
Figure 4E:
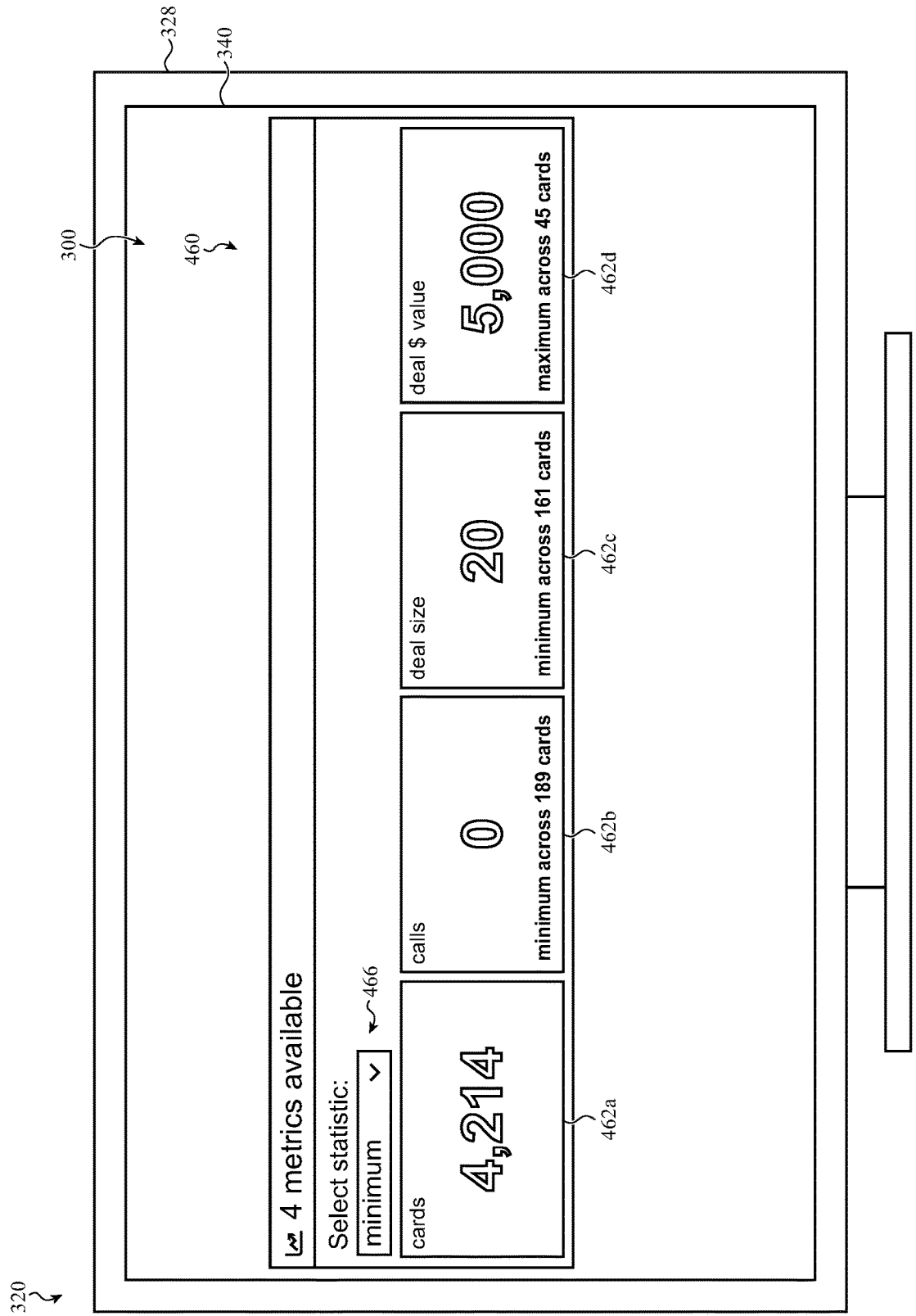

Turning to FIGS. 4D and 4E, the data visualization dashboard of the graphical user interface 400 may include one or more metric visualizations 460 for providing aggregated data regarding the dynamic item subset. As shown in FIG. 4D, the metric visualization 460 may include sections 462a-d, each section including a metric from the aggregated data. For example, section 462a displays a number of items (cards) in the dynamic item subset. Sections 462b-d display statistics regarding data fields of the dynamic item subset. In the example of FIG. 4D, the sections 462b-d display sums of data field values of data fields associated with items in the dynamic item subset ("calls", "deal size", and "deal value"). The sections 462b-d may additional display a number of items having the data fields for which the statistic is computed. The metric visualization 460 may include a selection element 466 for selecting the statistic that is displayed by the metric visualization. In the example of FIG. 4E, for example, the sections 462b-d display minimum values of the data field values. Other statistics may be displayed, including mathematical averages, maximums, and the like.

As noted herein, users may select or provide parameters for defining a dynamic item subset via the graphical user interfaces of the client application. FIGS. 5A-6D depict an example graphical user interface for managing a dynamic item subset. FIGS. 5A-5D depict an example graphical user interface providing parameters for defining a dynamic item subset that may be provided as a result of instantiating or executing a graphical client application on a client device. As described herein the parameters provided via the client application may be used to filter items from the item-tracking platforms to define dynamic item subsets for user-defined tiles. Users may provide parameters during creation of a dynamic item subset or after a dynamic item subset has been created to update or modify the items in the dynamic item subset.

Figure 5A:
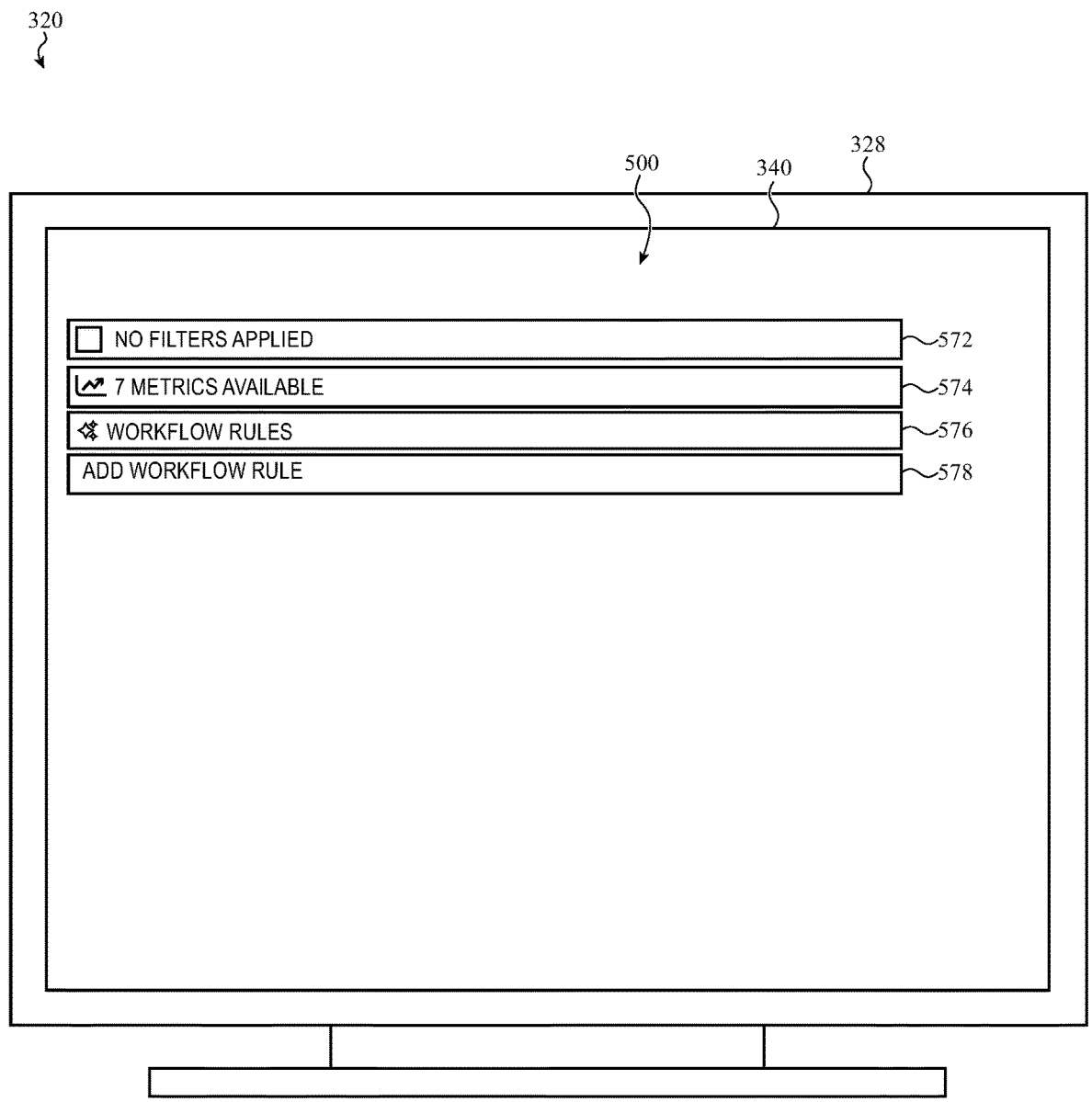
FIGS. 5A-5D depict an example graphical user interface providing parameters for defining a dynamic item subset that may be provided as a result of instantiating or executing a graphical client application on a client device.

As shown in FIG. 5A, the graphical user interface may include a control region 500, which includes filter element 572, metrics element 574, workflow rule management element 576 and workflow rule creation element 578. Metrics element 574 may be selected to display the metric visualizations 460 described with respect to FIGS. 4D and 4E. Workflow rule management element 576 may be selected to view and modify existing workflow rules. Workflow rule creation element 578 may be selected to create a new workflow rule, as described in more detail with respect to FIGS. 6A-6B.

Figure 5B:
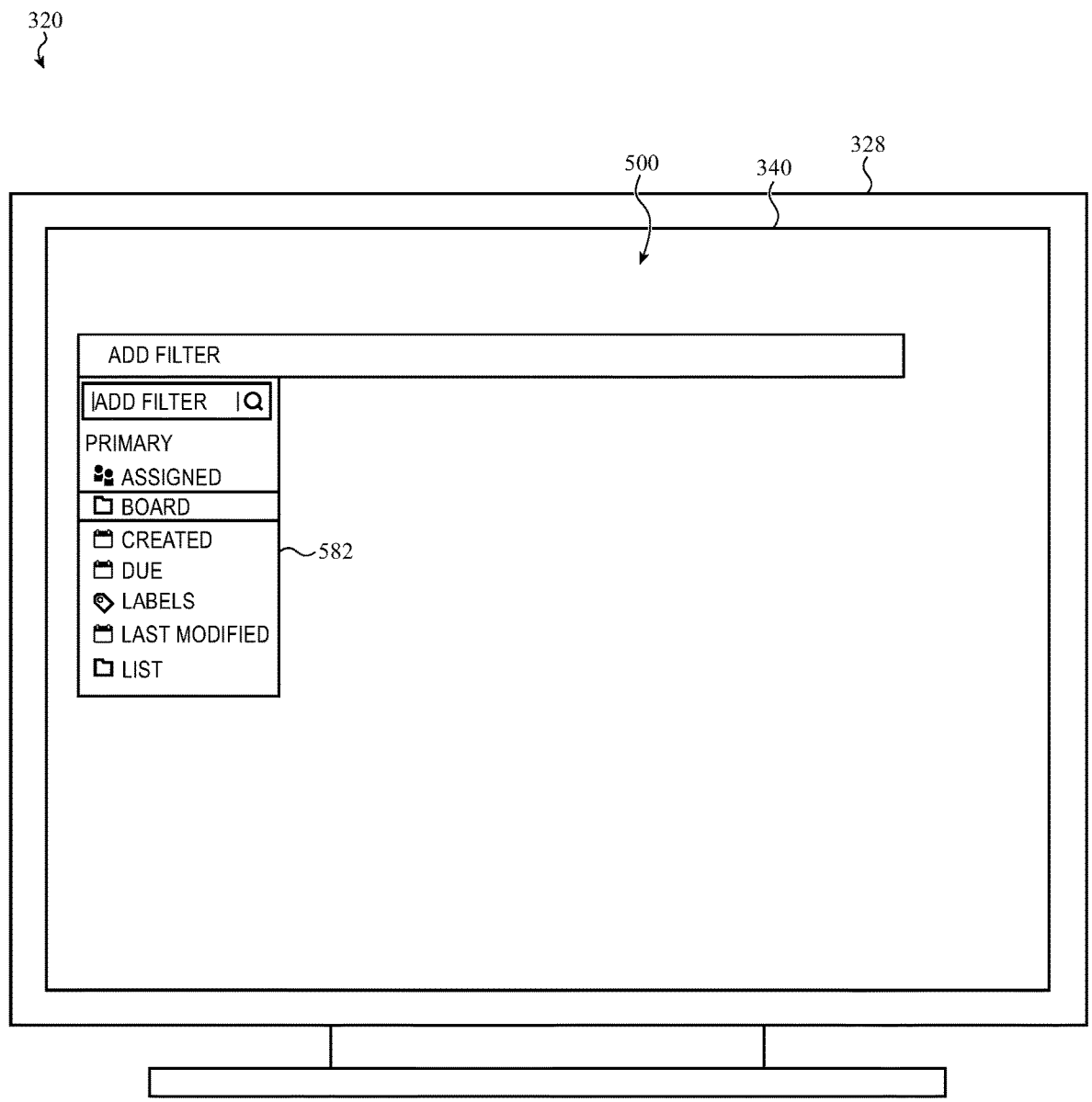
Figure 5C:
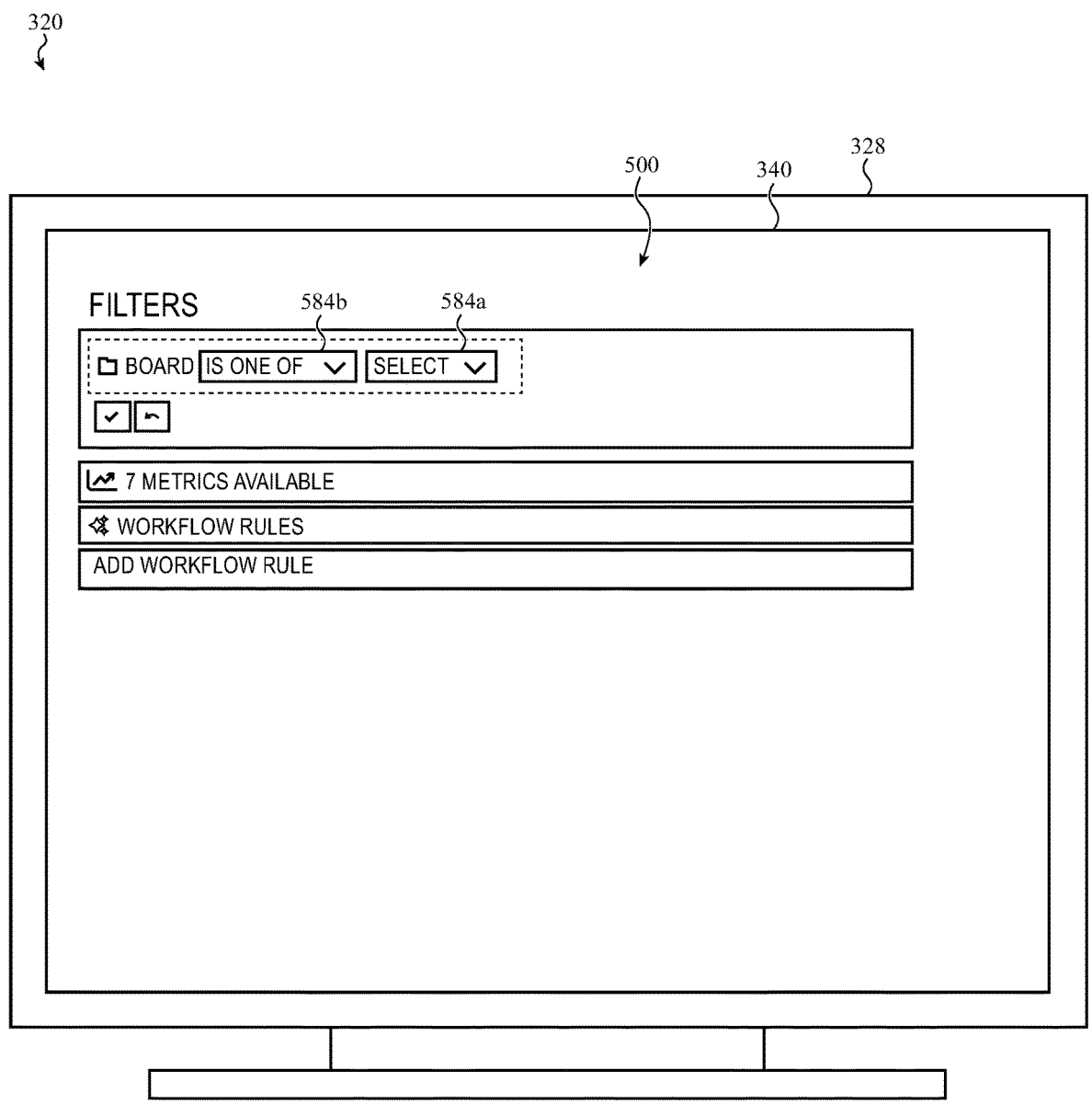
Figure 5D:
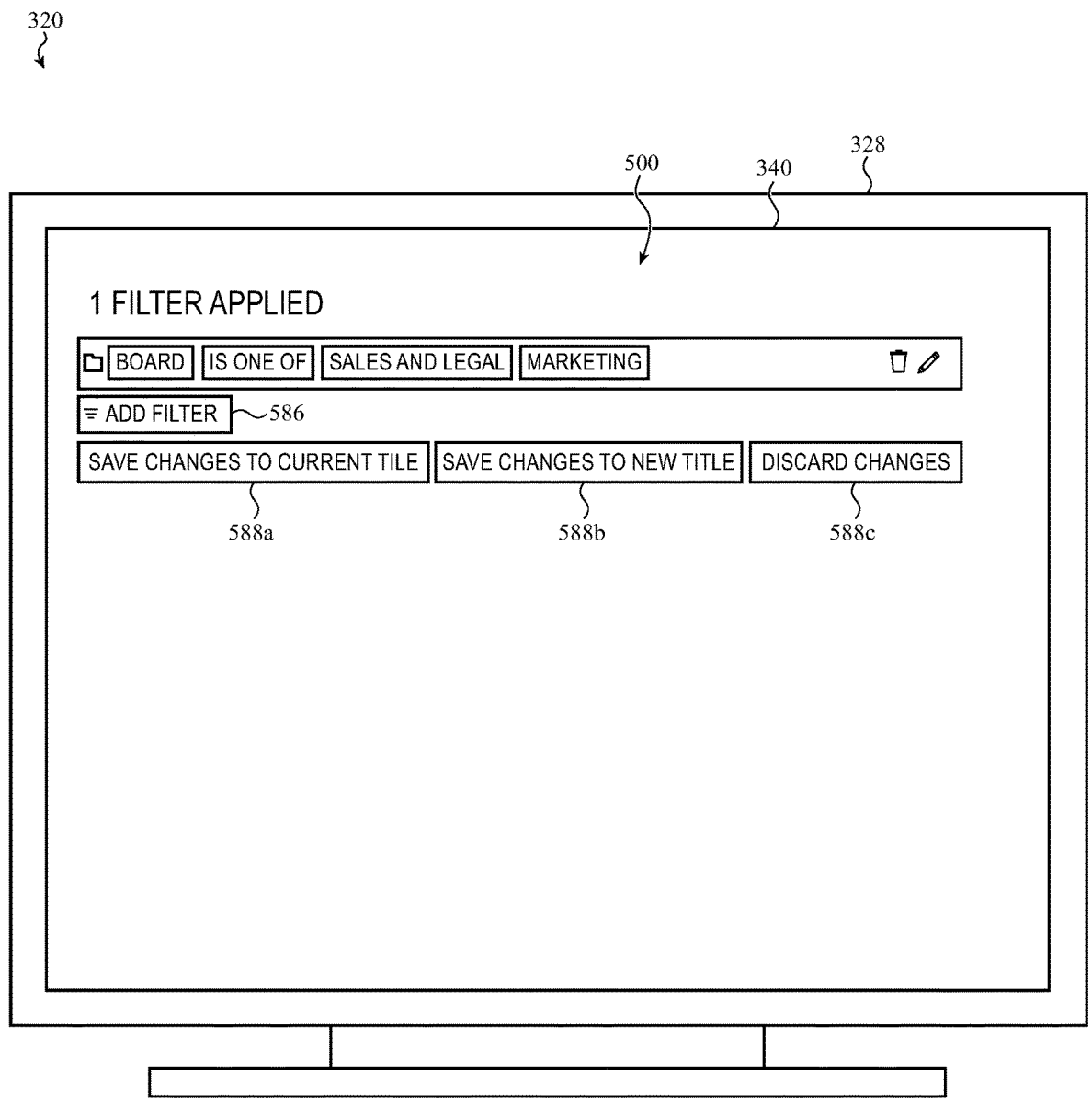

Filter element 572 may be used to provide parameters to define and/or modify the dynamic item subset corresponding to the data visualization dashboard. Turning to FIG. 5B, selecting the filter element 572 may display a list 582 of data fields for defining parameters for the dynamic item subset. Turning to FIG. 5C, once a field is selected, the graphical user interface may display a value selection element 584a with possible values for the field and a modifier element 584b describing the desired relationship between the selected values. Turning to FIG. 5D, once the values and modifiers are selected, the graphical user interface may provide a selection element 586 to add the filter to the dynamic item subset and selection elements 588a-c to save changes to a current tile (modify the dynamic item subset), save changes to a new tile (create a new dynamic item subset), or discard changes.

Figure 6A:
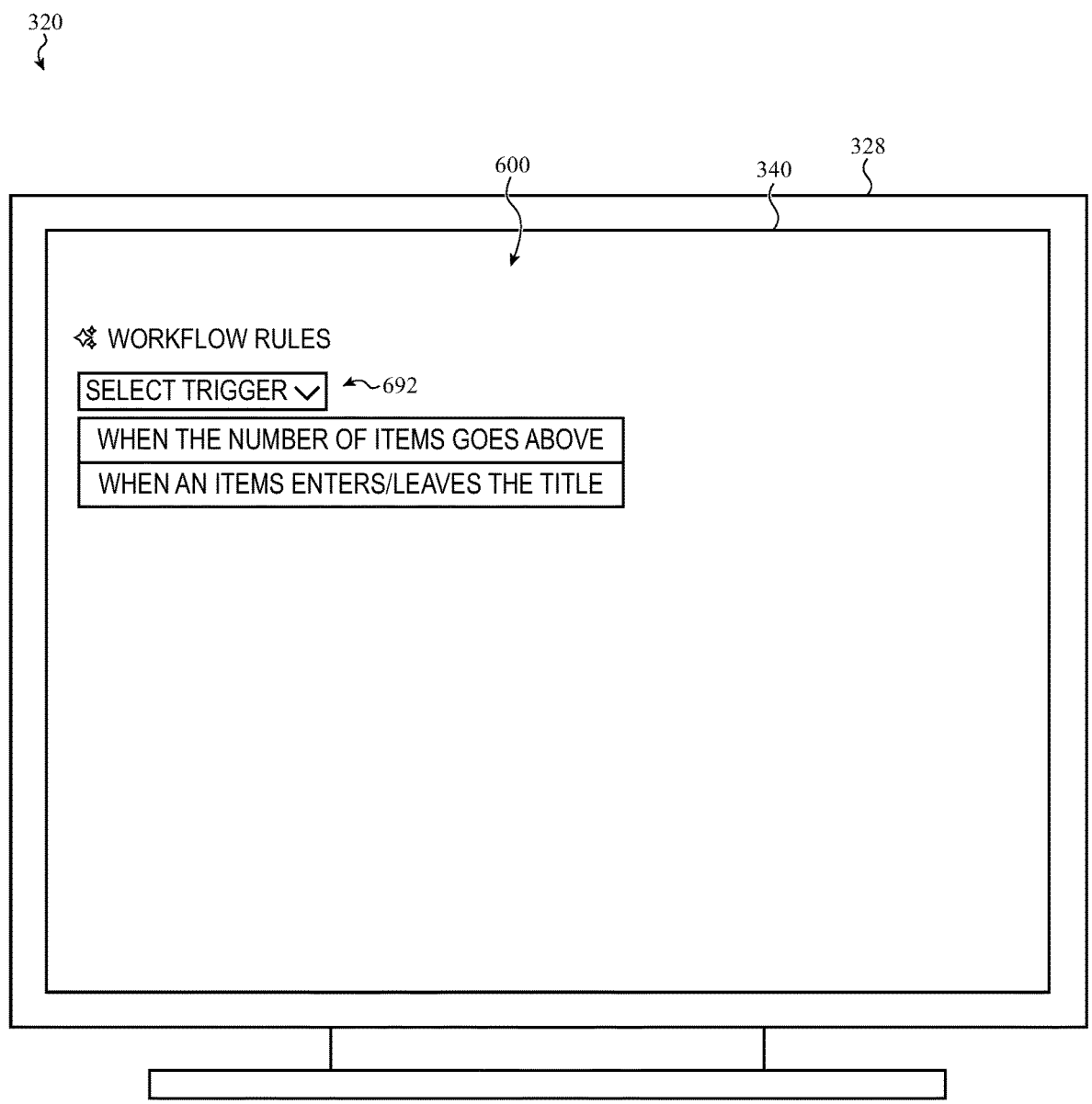
FIGS. 6A-6B depict an example graphical user interface for establishing and/or modifying workflow rules relating to dynamic item subsets.
Figure 6B:
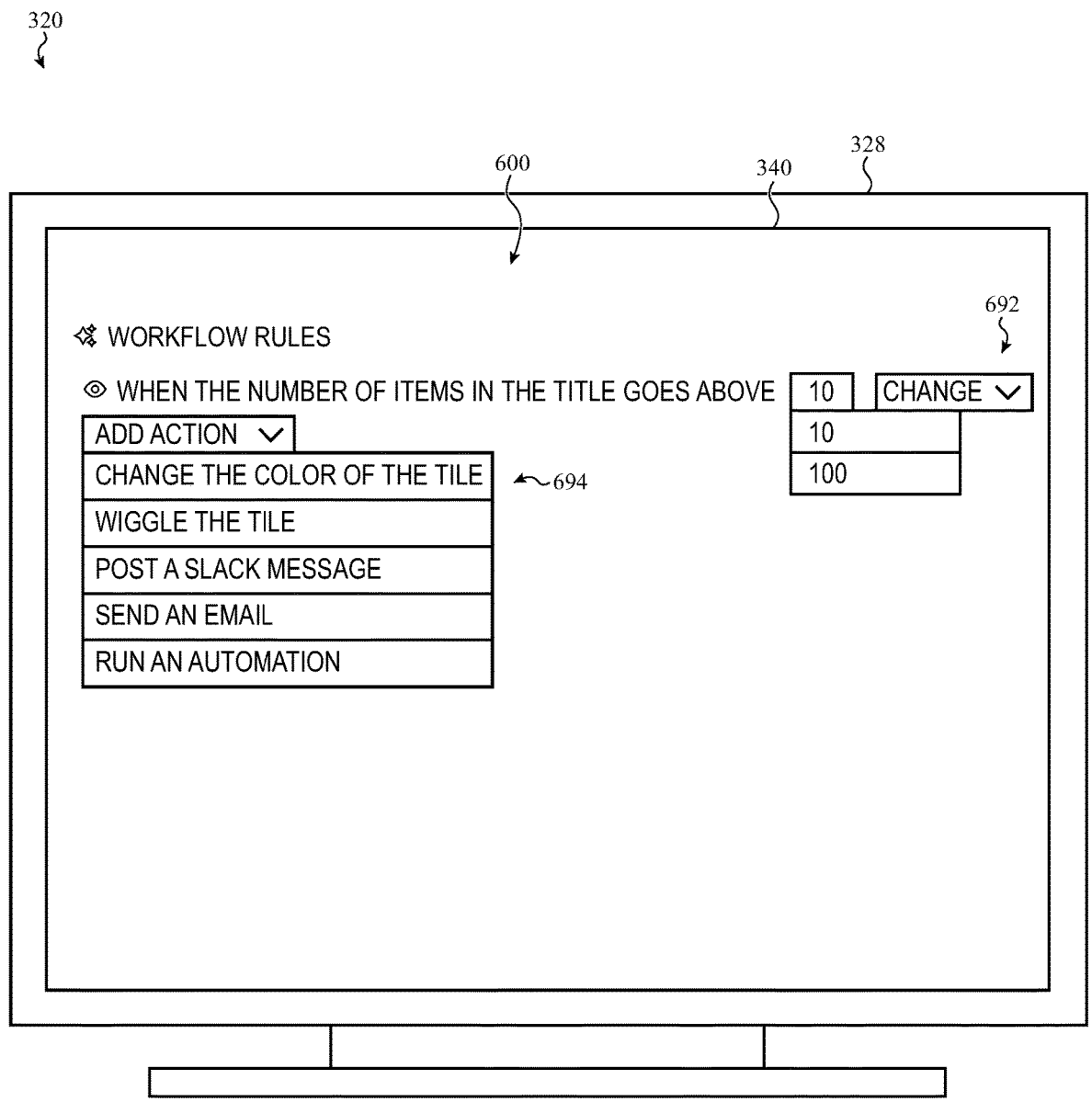

As noted herein, users may use the graphical user interfaces of the client application to establish and/or modify workflow rules relating to dynamic item subsets. FIGS. 6A-6B depict an example graphical user interface 600 for establishing and/or modifying workflow rules relating to dynamic item subsets. The graphical user interface 600 may be provided in response to selection of one of the elements 576 or 578 of the control region 500 described with respect to FIG. 5A.

As noted here, a workflow rule may include a trigger and an action. As shown in FIGS. 6A-6B, the graphical user interface 600 may include a trigger selection region 692 for selecting a trigger and associated parameters for the workflow rule. Once the trigger is selected, the graphical user interface 600 may display an action selection region 694 for selecting the action to perform in response to the trigger. Examples of triggers include reaching a threshold for a count of items (e.g., total count and/or a count of items satisfying specified criteria), adding or removing item(s) from a dynamic item subset (e.g., creating or deleting items, changing structured attributes associated with items that result in the items being to be added or removed from one or more dynamic item subsets, etc.). Actions may include performing certain operations within the client application, such as providing a notification, changing formatting within a graphical user interface (e.g., changing a size, color or other formatting of at least part of a tile or visualization), animating (e.g., causing to move) at least part of a tile or visualization element, or the like. Actions may additionally or alternatively include performing operations or causing operations to be performed outside of the client application, including sending notifications, messages, or other data to one or more software applications or platforms (e.g., sending an email, a SLACK message, or the like).

These foregoing embodiments depicted in FIGS. 3-6B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 7:
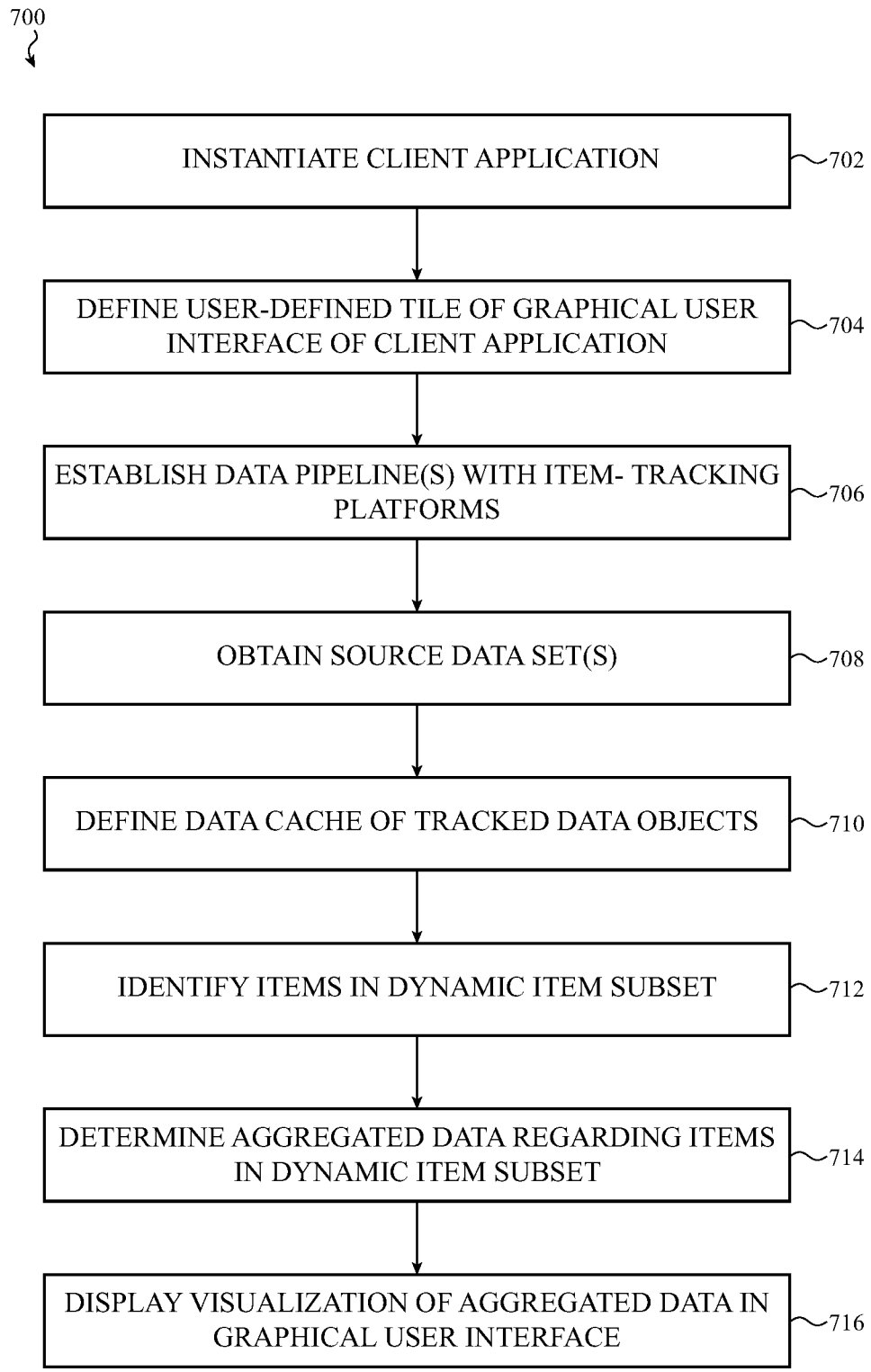
FIG. 7 is a flowchart depicting example operations of a method for providing one or more visualizations of aggregated data from multiple item-tracking platforms.

FIG. 7 is a flowchart depicting example operations of a method 700 for providing one or more visualizations of aggregated data from multiple item-tracking platforms. Some or all of the operations of the method 700 may be performed by a data engine (e.g., data engine 110) and/or a client application provided by the data engine. The operations may be performed by one or more processors at one or more servers of the data engine and/or one or more client devices executing the client application. Example computing resources (e.g., a processing unit) that may be used to perform the operations of the method 700 are discussed below with respect to FIG. 8.

At operation 702, the client application is instantiated or executed on a client device. As noted herein the client application may provide a graphical user interface at the client device. The graphical user interface may be similar to one or more or of the graphical user interfaces described above with respect to FIGS. 3-6B. In some cases, the graphical user interface includes a create element (e.g., a create element 370) that may be selected to define a user-defined tile within the user interface. As noted herein, defining a tile results in the creation by the data engine of a dynamic item subset corresponding to the tile and/or a data visualization dashboard. In response to a selection of the create element, the graphical user interface may present a list that includes a set of item-tracking platforms whose items may be included in the dynamic item subset.

At operation 704, the client application may define the user-defined tile in the graphical user interface. The client application may receive, via the graphical user interface, an indication of a subset (e.g., one or more) of the set of item-tracking platforms. The user may be able to select a subset of the set of item-tracking platforms via the graphical user interface. The user may also be able to provide account information (e.g., a username and password) or otherwise provide identifying information to allow the data engine to access the items associated with the user's account at each selected item-tracking platform. The client application may transmit the selected item-tracking platforms and/or the account information to the data engine. The data engine may access each item-tracking platform in the subset to access items associated with the user's account and/or which the user is authorized to access. In some cases, the user may specify a subset of the items that the user is authorized to access for access by the data engine. Accessing items may include any suitable means of receiving or retrieving items and associated data from the subset of item-tracking platforms, including webhooks, API calls, and the like.

The client application may additionally or alternatively receive, via the graphical user interface, one or more parameters for defining a dynamic item subset consisting of items from the subset of item-tracking platforms. As noted above, the parameters may include values for certain data fields associated with the items of the subset of item-tracking platforms. For example, the user may specify items from specified groups, boards, or projects, items having specified deadlines, items associated with specified people, and the like.

At operation 706, the data engine establishes a data pipeline with each of the selected item-tracking platforms. As noted herein, the data pipeline may be any suitable connection for data to flow between the item-tracking platforms and the data engine, including API calls, webhooks, and the like.

At operation 708, the data engine obtains a source data set from each of the selected item-tracking platforms using the respective data pipeline. In some cases, the data engine obtains items at regular intervals. Additionally or alternatively, the data engine may obtain items upon requests made to the item-tracking platforms or notifications received from the item-tracking platforms. In some cases, the data engine 110 detects or is notified of changes to one or more items at the item-tracking platforms and obtains items and/or structured attributes related to the changes in response.

At operation 710, the data engine defines a data cache of tracked data objects (e.g., items, structured attributes, groups of items, etc.) corresponding to the source data sets received from the item-tracking platforms. As noted herein, each item-tracking platform may have a different native data object structure. As a result, the source data sets obtained from different item-tracking platforms may have different native data object structures. The data engine may define the data cache by extracting structured attributes from the respective native data object structures of each source data set for storage in a common data object structure of the data cache. The data engine may identify structured attributes that are common across different source data sets and/or which correspond to structured attributes in other source data sets. In some cases, the data engine identifies and extracts structured attributes that correspond to structured attributes or data fields of the data cache. Once items are in the structured data cache, they may be identified as items belonging to one or more dynamic item subsets. By extracting structured attributes and defining a structured data cache, the data engine allows items from different item-tracking platforms to be stored such that they are compatible with one another and can belong to the same dynamic item subsets. As a result, aggregated data may be determined for items from multiple different item-tracking platforms.

At operation 712, the data engine identifies which items belong in the dynamic item subset by filtering the tracked data objects in the data cache using the one or more received parameters. For example, the data engine may filter the tracked data objects using data fields of items that correspond to the parameters. The data engine may construct a list or ledger of items in the dynamic item subset and/or apply tags or labels to items to indicate that they are in the dynamic item subset.

At operation 714, the data engine determines aggregated data regarding the items in the dynamic item subset. As noted herein, aggregated data may include statistics and other information regarding one or more data fields of multiple items of the dynamic item subset. Determining aggregated data may include applying one or more functions to data associated with items in the dynamic item subset. Aggregated data may include mathematical averages (e.g., mean, median, mode, etc.), sums of data field values, maximum and minimum values, counts of items, and the like. Aggregated data may be computed for the entire dynamic item subset or for items of the subset satisfying specified criteria.

At operation 716, the client application displays a visualization of the aggregated data in the graphical user interface. As noted herein, visualizations may include graphical representations of the determined aggregated data, including charts, cluster diagrams, and other graphical elements for representing the aggregated data visually. The data engine and/or the client application may generate visualizations using aggregated data. In some cases, the visualizations may be automatically generated based on characteristics of the aggregated data. For example if aggregated data refers to people or groups, the visualization may be a cluster chart. One or more visualizations may be displayed as part of data visualization dashboards provided by the client application. As items of the dynamic item subset change, the visualization engine may compute updated aggregated data, and the visualizations corresponding to the aggregated data may be updated accordingly.

Figure 8:
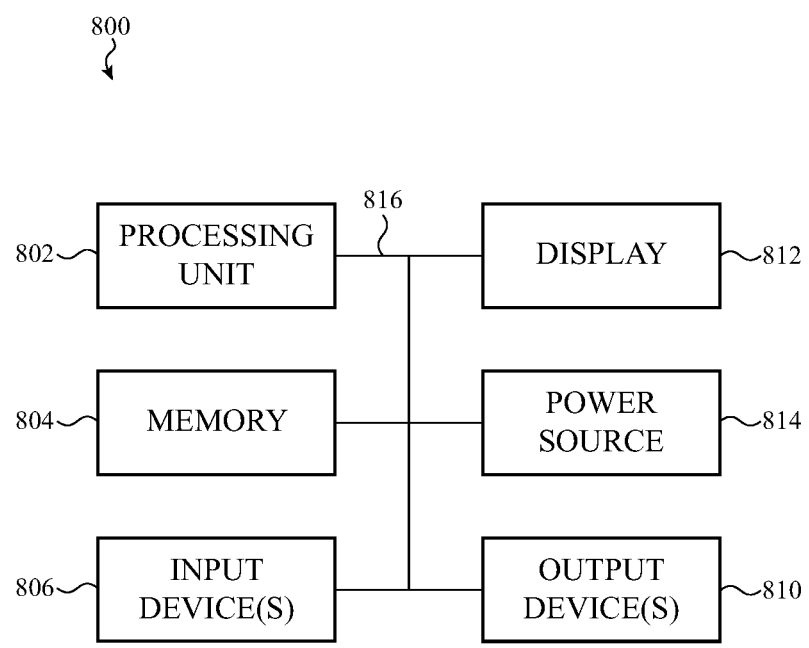
FIG. 8 illustrates a sample electrical block diagram of an electronic device that may perform the operations described herein.

FIG. 8 illustrates a sample electrical block diagram of an electronic device 800 that may perform the operations described herein. The electronic device 800 may in some cases take the form of any of the electronic devices described with reference to FIGS. 1-7, including client devices 120a-c, 130 and/or servers or other devices associated with the data engine 110 or the item-tracking platforms 130a-c. The electronic device 800 can include one or more of a display 812, a processing unit 802, a power source 814, a memory 804 or storage device, input devices 806, and output devices 810. In some cases, various implementations of the electronic device 800 may lack some or all of these components and/or include additional or alternative components.

The processing unit 802 can control some or all of the operations of the electronic device 800. The processing unit 802 can communicate, either directly or indirectly, with some or all of the components of the electronic device 800. For example, a system bus or other communication mechanism 816 can provide communication between the processing unit 802, the power source 814, the memory 804, the input device(s) 806, and the output device(s) 810.

The processing unit 802 can be implemented as any electronic device capable of processing, receiving, or transmitting data or instructions. For example, the processing unit 802 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 800 can be controlled by multiple processing units. For example, select components of the electronic device 800 (e.g., an input device 806) may be controlled by a first processing unit and other components of the electronic device 800 (e.g., the display 812) may be controlled by a second processing unit, where the first and second processing units may or may not be in communication with each other.

The power source 814 can be implemented with any device capable of providing energy to the electronic device 800. For example, the power source 814 may be one or more batteries or rechargeable batteries. Additionally or alternatively, the power source 814 can be a power connector or power cord that connects the electronic device 800 to another power source, such as a wall outlet.

The memory 804 can store electronic data that can be used by the electronic device 800. For example, the memory 804 can store electronic data or content such as, for example, audio and video files, documents and applications, device settings and user preferences, timing signals, control signals, and data structures or databases. The memory 804 can be configured as any type of memory. By way of example only, the memory 804 can be implemented as random access memory, read-only memory, Flash memory, removable memory, other types of storage elements, or combinations of such devices.

In various embodiments, the display 812 provides a graphical output, for example associated with an operating system, user interface, and/or applications of the electronic device 800. In one embodiment, the display 812 includes one or more sensors and is configured as a touch-sensitive (e.g., single-touch, multi-touch) and/or force-sensitive display to receive inputs from a user. For example, the display 812 may be integrated with a touch sensor (e.g., a capacitive touch sensor) and/or a force sensor to provide a touch- and/or force-sensitive display. The display 812 is operably coupled to the processing unit 802 of the electronic device 800.

The display 812 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 812 is positioned beneath and viewable through a cover that forms at least a portion of an enclosure of the electronic device 800.

In various embodiments, the input devices 806 may include any suitable components for detecting inputs. Examples of input devices 806 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 806 may be configured to detect one or more particular types of input and provide a signal (e.g., an input signal) corresponding to the detected input. The signal may be provided, for example, to the processing unit 802.

As discussed above, in some cases, the input device(s) 806 include a touch sensor (e.g., a capacitive touch sensor) integrated with the display 812 to provide a touch-sensitive display. Similarly, in some cases, the input device(s) 806 include a force sensor (e.g., a capacitive force sensor) integrated with the display 812 to provide a force-sensitive display.

The output devices 810 may include any suitable components for providing outputs. Examples of output devices 810 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 810 may be configured to receive one or more signals (e.g., an output signal provided by the processing unit 802) and provide an output corresponding to the signal.

In some cases, input devices 806 and output devices 810 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 802 may be operably coupled to the input devices 806 and the output devices 810. The processing unit 802 may be adapted to exchange signals with the input devices 806 and the output devices 810. For example, the processing unit 802 may receive an input signal from an input device 806 that corresponds to an input detected by the input device 806. The processing unit 802 may interpret the received input signal to determine whether to provide and/or change one or more outputs in response to the input signal. The processing unit 802 may then send an output signal to one or more of the output devices 810, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

Example computing resources or appliances that may be configured to perform the methods described herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:

1. A computer-implemented method for visualizing data associated with a set of issue-tracking platforms, the computer-implemented method comprising:
instantiating a client application on a client device, the client application configured to:
provide a graphical user interface (GUI) on a display of the client device;
define a user-defined tile on the GUI;
receiving, via the GUI, a selection of one or more issue-tracking platforms of the set of issue-tracking platforms, each issue-tracking platform of the set of issue-tracking platforms configured to track a respective set of issues, each issue of the respective set of issues comprising an issue title, a set of assigned users, and an issue deadline;
establishing a respective data pipeline with the one or more issue-tracking platforms of the set of issue-tracking platforms;
obtaining a first data set from a first issue-tracking platform of the two or more issue-tracking platforms using the respective data pipeline, the first data set having a first native data object structure, wherein the first native data object structure is incompatible with a data object structure of the client application;
generating a first transformed data set by transforming the first native data object structure of the first data set into the data object structure of the client application, the transforming including extracting a first set of structured attributes from the first native data object structure, the first set of structured attributes corresponding to a first set of issues associated with the first issue-tracking platform;
obtaining a second data set from a second issue-tracking platform of the two or more issue-tracking platforms using the respective data pipeline, the second data set having a second native data object structure, wherein the second native data object structure is incompatible with the data object structure of the client application;
generating a second transformed data set by transforming the second native data object structure into the data object structure of the client application, the transforming including extracting a second set of structured attributes from the second native data object structure, the second set of structured attributes corresponding to a second set of issues associated with the second issue-tracking platform;
computing a first dynamic item subset by applying a first rule to one or more of the first transformed data set or the second transformed data set;
displaying, within the user-defined tile, a first dynamic issue count corresponding to the first dynamic item subset;
in response to an issue being closed or reassigned by the first issue tracking system or the second issue tracking system, generating a changeset based on a comparison between a current version of the first dynamic item subset with another version of the first dynamic item subset; and in response to receiving a user input, causing display of a changeset metric in the GUI of the client application.

2. The computer-implemented method of claim 1, wherein:
the user-defined tile is a first user-defined tile; and
the client application is further configured to:
define a second user-defined tile;
display, in the graphical user interface, a set of tiles comprising the first user-defined tile and the second user-defined tile;
each tile of the set of tiles corresponds to a respective dynamic item subset; and
each tile of the set of tiles displays respective aggregated data for the respective dynamic item subset.

3. The computer-implemented method of claim 1, wherein the client application is further configured to display a data visualization dashboard that displays information corresponding to tracked changes in any one of the first set of issues or the second set of issues.

4. The computer-implemented method of claim 3, wherein the data visualization dashboard comprises a graphical representation of the first set of issues assigned to a first set of users and the second set of issues assigned to a second set of users.

5. The computer-implemented method of claim 3, wherein the data visualization dashboard comprises a calendar that indicates one or more dates associated with at least one of the first set of issues or the second set of issues.

6. The computer-implemented method of claim 1, wherein the first set of issues in the first dynamic item subset corresponds to at least one of tasks or support tickets associated with the set of issue-tracking platforms.

7. The computer-implemented method of claim 1, further comprising:
receiving, via the graphical user interface, a workflow rule for performing an action in response to updating the first dynamic item subset; and
performing the action indicated in the workflow rule.

8. The computer-implemented method of claim 7, wherein the action is at least one of changing a formatting, a color, or a size of the first user-defined tile associated with the first dynamic item subset.

9. The computer-implemented method of claim 8, wherein the action further includes causing display of a notification, on the GUI, in response to updating the first dynamic item subset.

10. A computer-implemented method for visualizing aggregated data in a graphical user interface (GUI) of a client application, the computer-implemented method comprising:
receiving, via the GUI of the client application:
a first request to create a first tile for display within a set of tiles in the graphical user interface, the first tile corresponding to a first dynamic item subset corresponding to a first set of items tracked by a first item-tracking platform; and
a second request to create a second tile for display within the set of tiles, the second tile corresponding to a second dynamic item subset corresponding to a second set of items tracked by a second item-tracking platform;
obtaining a first source data set from the first item-tracking platform, the first source data set having a first native data object structure that is incompatible with a data object structure of the client application;
obtaining a second source data set from the second item-tracking platform, the second source data set having a second native data object structure that is incompatible with the data object structure of the client application;

generating a first transformed data set by transforming the first native data object structure of the first source data set into the data object structure of the client application, the transforming including extracting a first set of structured attributes from the first native data object structure, the first set of structured attributes corresponding to a first set of items associated with the first item-tracking platform;

generating a second transformed data set by transforming the second native data object structure of the second source data set into the data object structure of the client application, the transforming including extracting a second set of structured attributes from the second native data object structure, the second set of structured attributes corresponding to a second set of items associated with the second item-tracking platform;

in accordance with the first request:
constructing the first dynamic item subset by applying a first rule to the first transformed data set;
extracting first data from each item of the first set of items corresponding to the first dynamic item subset;
generating a first statistic using the extracted first data; and
causing display of the first tile in the GUI, the first tile including first aggregated data corresponding to the extracted first data and the first statistic;

in accordance with the second request:
constructing the second dynamic item subset by applying a second rule to the second transformed data set;
extracting second data from each item of the second set of items corresponding to the second dynamic item subset;
generating a second statistic using the extracted second data; and
causing display of the second tile in the GUI, the second tile including second aggregated data corresponding to the extracted second data and the second statistic; and in accordance with an item of the first item-tracking platform or the second item-tracking platform being closed or reassigned, generating a changeset based on a comparison between a current version of the first dynamic item subset with another version of the first dynamic item subset or a current version of the second dynamic item subset with another version of the second dynamic item subset;

in response to receiving a user input, causing display of a changeset metric in the GUI of the client application.

11. The computer-implemented method of claim 10, further comprising:
establishing a first data pipeline with the first item-tracking platform; and
establishing a second data pipeline with the second item-tracking platform, wherein the first source data set is obtained through the first data pipeline and the second source data set is obtained through the second data pipeline.

12. The computer-implemented method of claim 10, wherein the first dynamic item subset further comprises items tracked by the second item-tracking platform.

13. The computer-implemented method of claim 10, wherein:
each item of the first set of items comprises a respective set of data fields; and determining the first aggregated data for the first dynamic item subset comprises:
identifying a data field of the respective set of data fields; and
determining a data field statistic of the data field.

14. The computer-implemented method of claim 10, further comprising:
receiving a first selection of the first tile;
causing display of a first data visualization dashboard comprising a first visualization of the first aggregated data;
receiving a second selection of the second tile; and
causing display of a second data visualization dashboard comprising a second visualization of the second aggregated data.

15. A computer-implemented method for generating a set of tiles for display in a graphical user interface (GUI) of a client application, the computer-implemented method comprising:
receiving, via the GUI, an indication of a set of issue-tracking platforms, each issue-tracking platform of the set of issue-tracking platforms configured to track a respective set of issues, each issue of the respective set of issues comprising a respective issue title, a respective set of assigned users, and a respective issue deadline;
establishing a respective data pipeline with each issue-tracking platform of the set of issue-tracking platforms;
obtaining a respective source data set for each issue-tracking platform using the respective data pipeline, each source data set having a respective native data object structure that is incompatible with a data object structure of the client application;
generating a respective transformed data set by transforming the respective native data object structure of the respective source data set into the data object structure of the client application, the transforming including extracting a respective set of structured attributes from the respective native data object structure, the respective set of structured attributes corresponding to the respective set of issues of the respective issue-tracking platform;
receiving, via the GUI:
a request to create a tile for display in the graphical user interface; and
an input specifying a set of users for defining a dynamic item subset;
computing the dynamic item subset by applying a rule to the respective transformed data set to extract a particular set of issues, the particular set of issues being assigned to the set of users;
determining a data element by extracting data from the dynamic item subset;
generating the tile for display in the graphical user interface, the tile including the data element;
displaying the tile in the graphical user interface;
detecting a new issue created at the set of issue-tracking platforms;
determining that the set of users is assigned to the new issue;
updating the dynamic item subset to include the new issue;
determining an updated data element by extracting new data from the new issue; and
updating the tile to display the updated data element.

16. The computer-implemented method of claim 15, further comprising:

receiving, via the GUI, a selection of the tile; and in response to receiving the selection, displaying a data visualization dashboard comprising a set of visualizations corresponding to the dynamic item subset.

17. The computer-implemented method of claim 16, wherein the data visualization dashboard comprises a calendar that indicates one or more dates associated with the particular set of issues of the dynamic item subset.

18. The computer-implemented method of claim 15, wherein:

each issue comprises a set of data fields; and determining the data element comprises:

identifying a data field of the set of data fields; and extracting data from the data field from each issue in the dynamic item.

19. The computer-implemented method of claim 15, further comprising:

receiving, via the GUI, a workflow rule for performing an action in response to updating the tile; and in accordance with updating the tile, performing the action.

20. The computer-implemented method of claim 19, wherein the action comprises animating the tile.

* * * * *